Nov. 23, 1965  L. S. LONGENECKER  3,219,439
OPEN HEARTH UTILIZATION
Filed Sept. 28, 1962  12 Sheets-Sheet 4

INVENTOR.
Levi S. Longenecker
BY
HIS ATTORNEYS

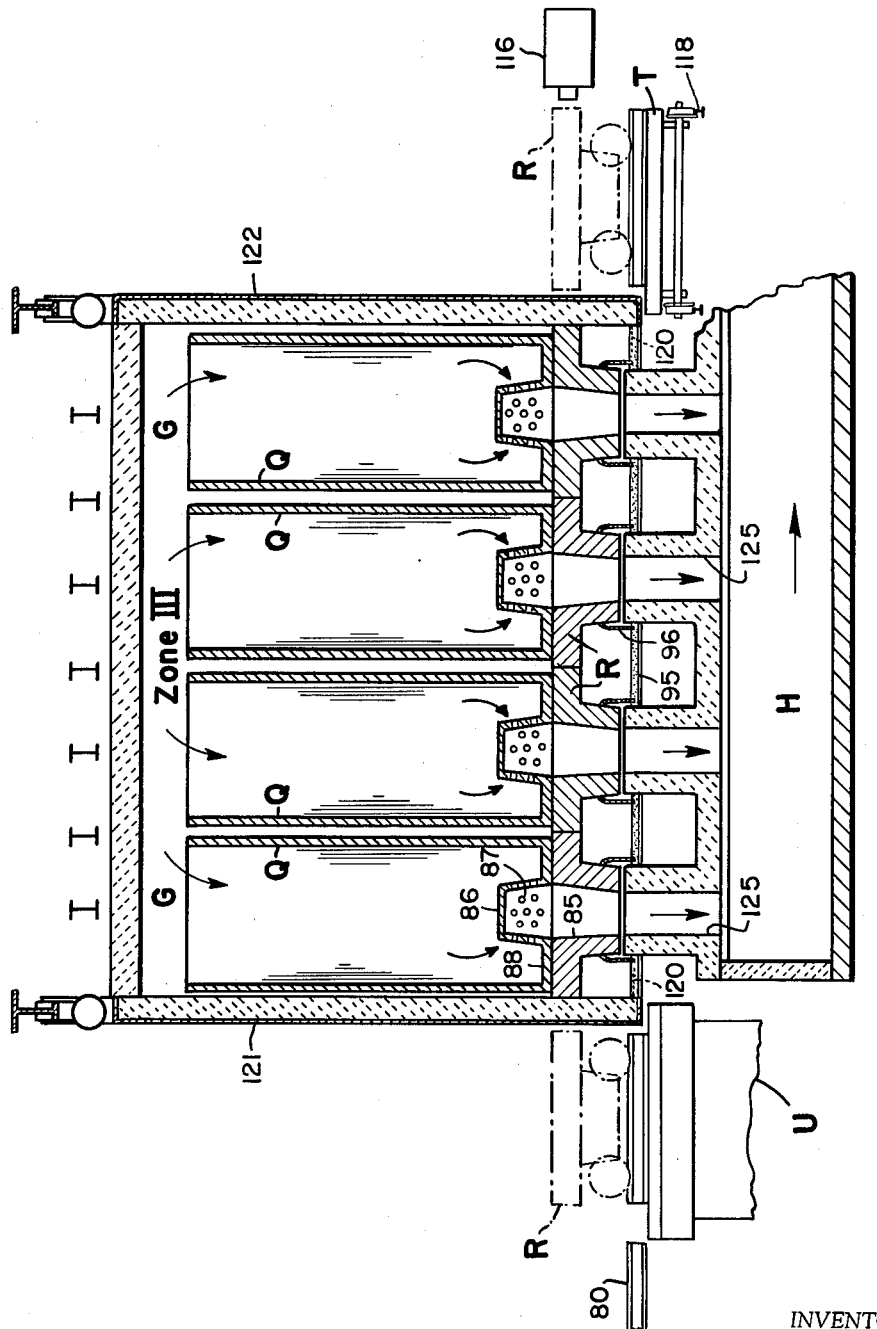

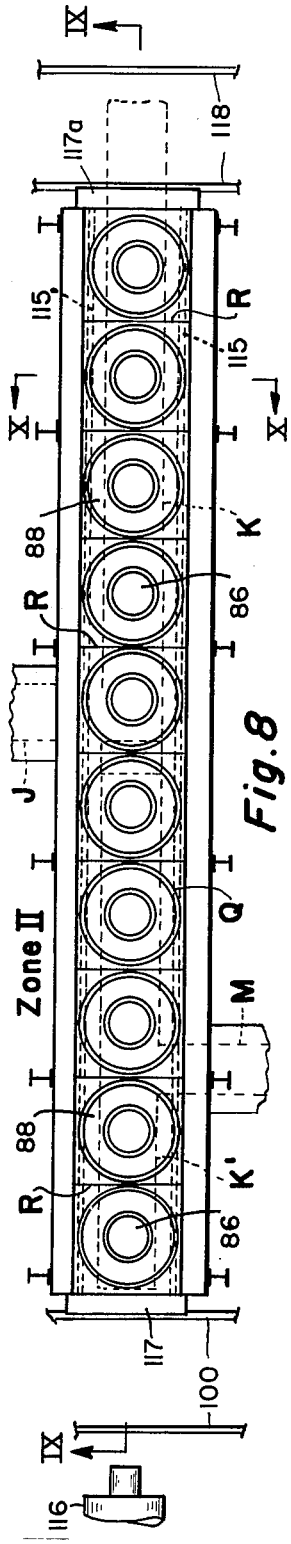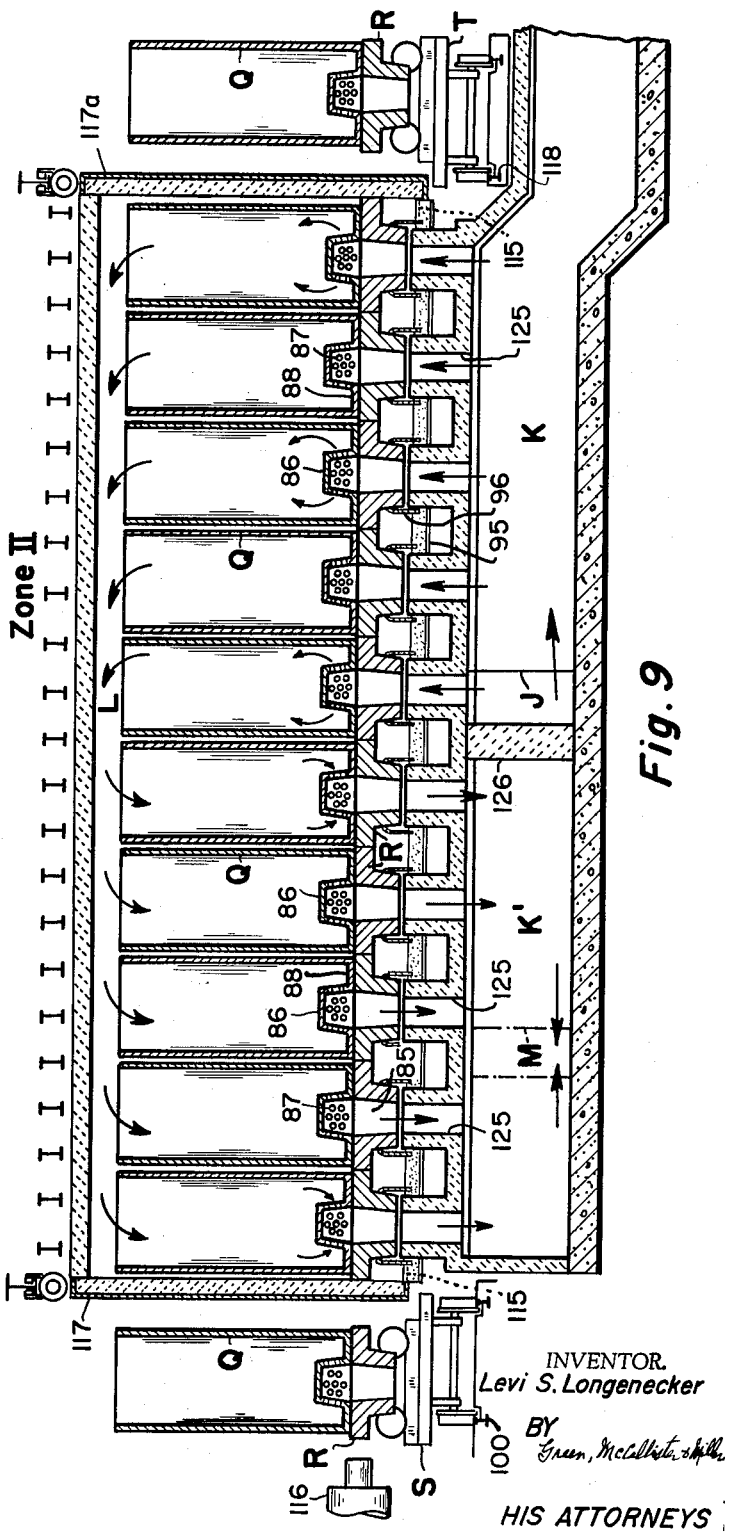

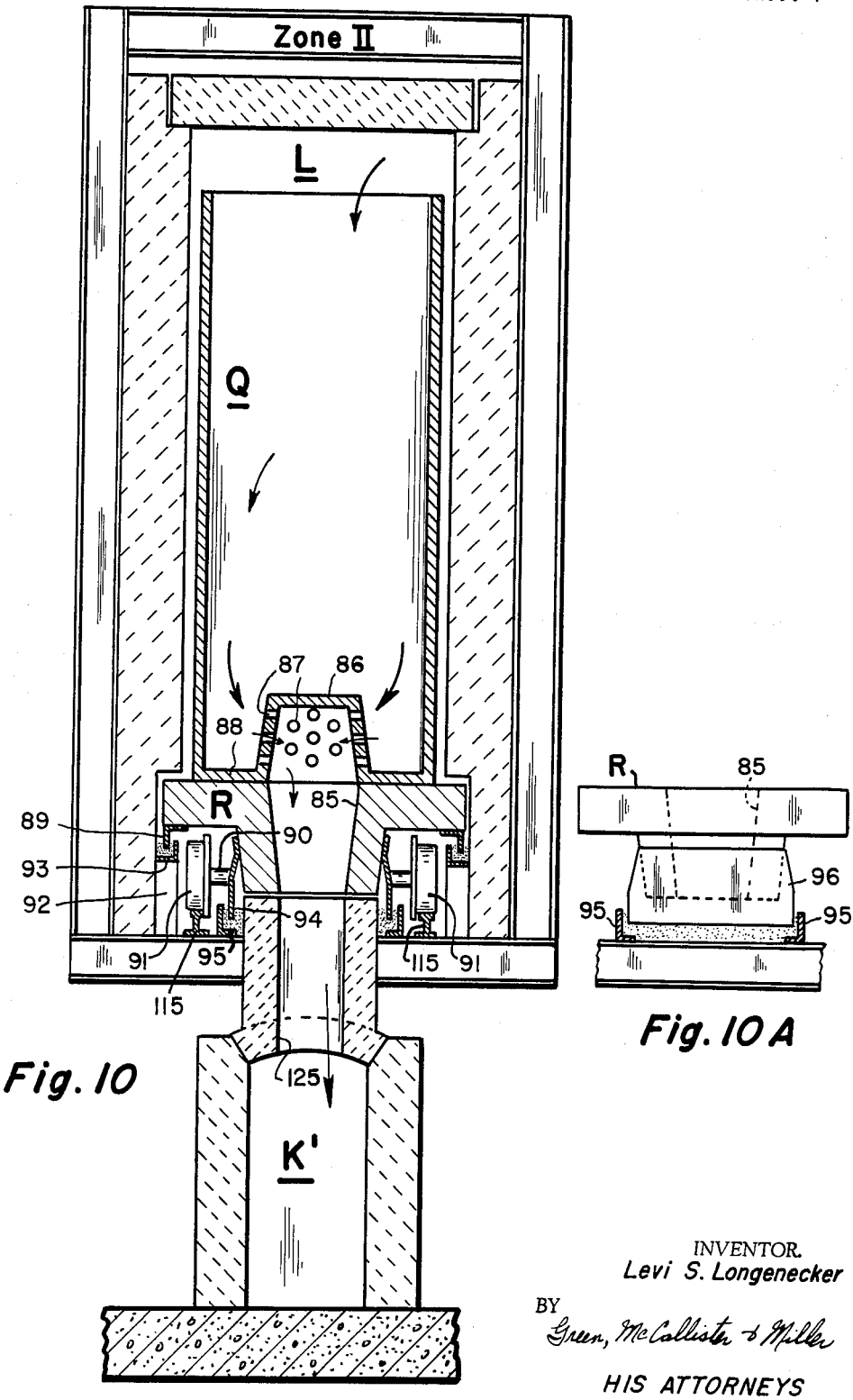

Nov. 23, 1965     L. S. LONGENECKER     3,219,439
OPEN HEARTH UTILIZATION
Filed Sept. 28, 1962     12 Sheets-Sheet 8

Nov. 23, 1965 L. S. LONGENECKER 3,219,439
OPEN HEARTH UTILIZATION
Filed Sept. 28, 1962 12 Sheets-Sheet 9
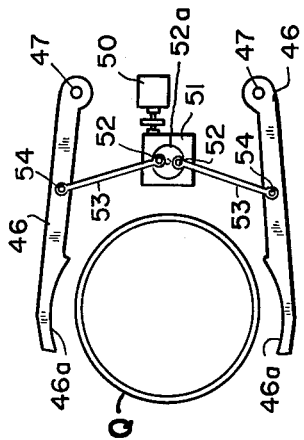
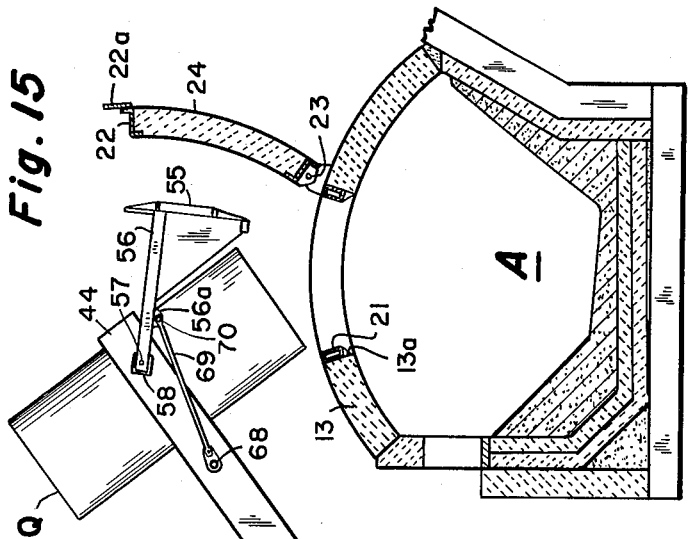
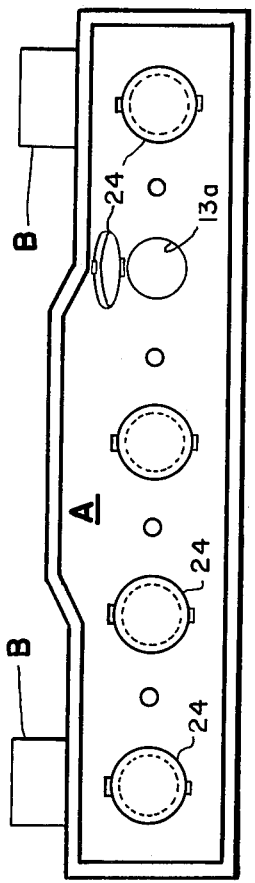
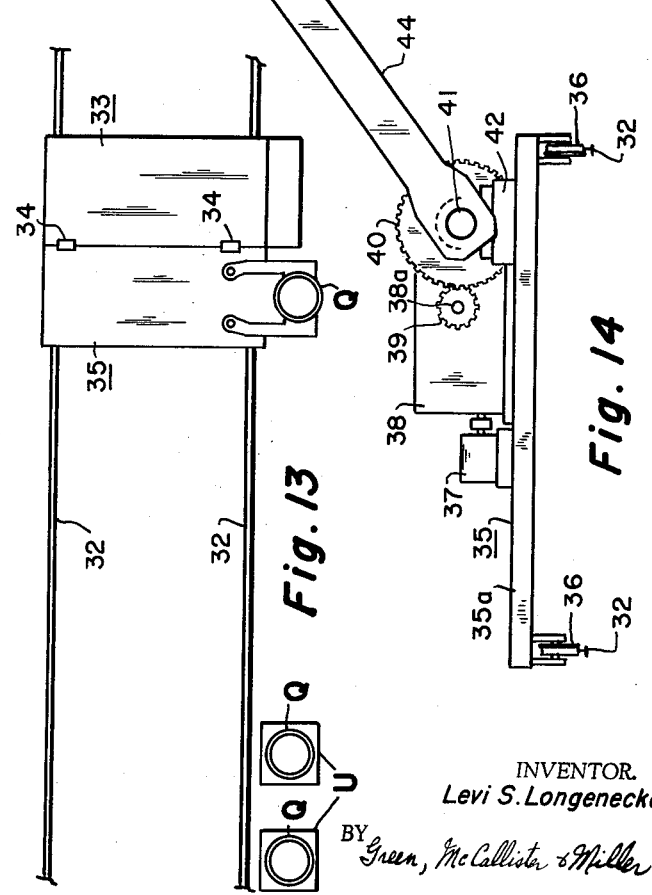
INVENTOR.
Levi S. Longenecker
BY Green, McCallister & Miller
HIS ATTORNEYS

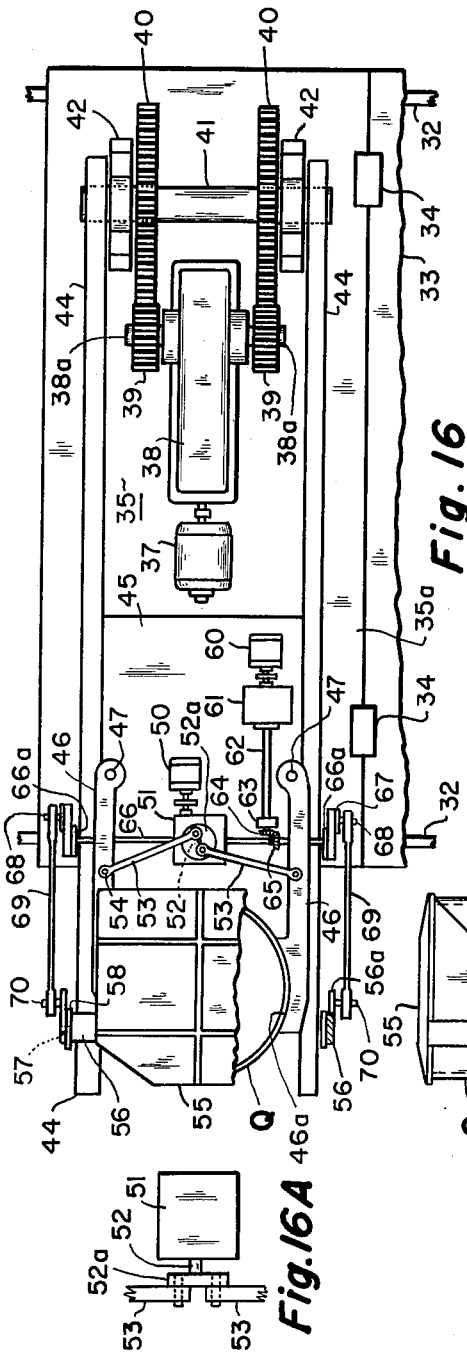

INVENTOR.
Levi S. Longenecker
BY
HIS ATTORNEYS

Nov. 23, 1965  L. S. LONGENECKER  3,219,439
OPEN HEARTH UTILIZATION
Filed Sept. 28, 1962  12 Sheets-Sheet 12

INVENTOR.
Levi S. Longenecker
BY Green, McCallister & Miller
HIS ATTORNEYS

United States Patent Office 3,219,439
Patented Nov. 23, 1965

3,219,439
OPEN HEARTH UTILIZATION
Levi S. Longenecker, 61 Mayfair Drive, Pittsburgh, Pa.
Filed Sept. 28, 1962, Ser. No. 226,920
17 Claims. (Cl. 75—60)

This invention relates to the refining or processing of metals, such as steel, and particularly, to an improved open hearth furnace utilization.

A phase of the invention relates to metal refining procedure and another phase relates to an improved open hearth construction and operating system or method.

For many years, those skilled in the metal arts and particularly, in the steel making art, have recognized that the refining or conditioning of large quantities of metals could be accomplished by open hearth furnaces to provide high quality metal. Electric furnaces have come into use for refining of relatively smaller quantities of special metals, such as alloys and, since World War II, top blown oxygen converters have come into rather extended use and into competition with open hearth furnaces, particularly in connection with the refining of basic steel. Although Bessemer converters have been used for refining and conditioning lower grades of steels and oxygen converters, by reason of refinements, have been able to produce relatively good quality metals, many skilled in the art still prefer an open hearth furnace product.

An open hearth furnace installation requires longitudinal plant floor space, is relatively expensive in its initial installation per ton of capacity as compared to an oxygen converter, requires considerable maintenance, has a higher average conversion cost per ton than an oxygen converter, requires a scrap charge to be proportioned as to its heavy, medium and light content, and is relatively inefficient from the standpoint of heat utilization. On the other hand, oxygen converters must use a high proportion of molten iron (a minimum of about 50% of the charge) and thus require a large blast furnace plant capacity, have a tendency to pick-up atmospheric contaminants, also require considerable maintenance, require a complex hood, take-off and fume conditioning system, require large overhead plant space to reach a comparable refining capacity, and need expensive and complex equipment for overhead feeding and for enabling them to be tilted in connection with the pouring of slag and refined metal.

Oxygen converters, however, are relatively faster in their refining action than open hearth furnaces and generally can be charged more quickly. An attempt has been made to speed up the charging of open hearth furnaces by providing them with a tilting hearth, such that scrap material may be charged by means of scrap boxes along a full front side of the furnace. In addition, attempts have been made to speed up the refining operation in an open hearth furnace by supplementing the normal fuel gas burning action, as effected by opposite end connected checkerwork, by adding oxygen to the furnace during the refining operation. My studies in this connection, however, have indicated that such attempts to improve the utilization of open hearth furnaces, do not go to the heart of the problem involved, and only add to fuel and equipment expense and increase wear and tear, particularly on the hearth and refractory lining. I have found that the real basic problem centers upon the relative inefficiency of the caloric utilization and in the need for a more efficient utilization of the furnace from the standpoint of its hearth.

The need for an open hearth furnace grew out of the growing scarcity of higher quality ores, but more recently, the need has been for a furnace which will be flexible, not only from the standpoint of the grade of the ores that may be available, but also from the standpoint of making possible a maximum effective utilization of scrap metals, such as are now available at relatively low tonnage cost, all without entailing a lowering of melting and refining efficiency or a non-economical increase in operating costs, operating time periods, etc.

In a conventional open hearth furnace, the hearth is limited in its effective length by end-positioned uptakes which lead to slag pockets and to checkerwork. In the conventional operation of an open hearth furnace combustion, fuel and air are alternately flowed-in through one end checkerwork (which has been previously heated by exhausting combustion gases), while hot combustion gases are flowed-out through the outer end checkerwork. That is, at timed intervals, the hot combustion gases are alternately exhausted from the opposite checkerwork during the refining operation.

The heat supplied by the fuel for melting and refining in a typical open hearth furnace has been calculated as being in the neighborhood of 3,200,000 B.t.u.'s per ingot ton. On the other hand, only about 900,000 B.t.u.'s are actually used in the melting and refining of the metal. The efficiency of the heating is thus poor; this is due to the fact that the burning hot gases must fill the chamber over he hearth and be of efficient intensity and heat content to melt and refine the metal which is carried by the hearth beneath an insulating slag blanket. This overall intense gaseous heat and its relatively long period of application are very damaging to the refractory lining of the furnace; also, at least minor repairs are normally required as to the banks and the bottom after each heat is tapped.

The heating operation in an open hearth furnace is also wasteful of time, since a single heat for full charging and heating cycle normally requires a minimum of about nine hours when molten metal constitutes the major portion of the charged material. If large quantities of scrap are to be used in the charge, then the time required for charging may be up to about fourteen hours, if an attempt is made to introduce the scrap through the ordinary front charging doors of the furnace and the scrap is placed in the usual manner substantially within the melt level of its hearth. Even where a tilting hearth is provided, so that a plurality of scrap boxes may be simultaneously fed into the furnace along a full front side thereof, the time for charging of scrap may be about three to six hours.

It has thus been an object of my invention to develop new and improved procedure for melting and refining base metals and particularly, from the standpoint of the utilization of an open hearth furnace, so as to make it more competitive with other types of melting vessels or furnaces, and primarily to overcome or to meet limiting factors which have heretofore presented a problem in the use of an open hearth furnace.

Another object of my invention has been to devise a new and highly improved utilization of an open hearth furnace so as to make it more efficient and effective from the standpoint of its heat energy and time period requirements.

Another object has been to devise a new melting and refining procedure for metals, such as steel, which will be highly competitive with existing procedures.

A further object has been to devise an improved procedure and utilization of scrap materials including ore and metals in a refining operation.

A further object has been to devise apparatus for preconditioning scrap material and for an improved feeding or charging of it into a furnace.

A still further object of my invention has been to provide an operating system or lay-out utilizing a modified open hearth construction that will make possible an efficient and effective pre-heating of charge materials by heat generated in the melting and refining operation.

Other objects involve an improved apparatus, system or procedure for feeding solid materials such as metal scrap and ore into a furnace, for employing solid charge materials in a new and highly effective manner in the furnace, for providing an improved melting-down procedure, for utilizing exhaust gases of the furnace in pre-heating solid charge materials before they are introduced into the furnace, for simplifying the pre-stack equipment requirements for conditioning the exhaust gas and fume, for providing means for handling the solid charge materials and processing them before introduction into the furnace, for eliminating the conventional end checkerwork of an open hearth furnace and increasing its effective hearth or melting area, for reducing the wear and tear on the furnace interior incident to charging, melting and refining metal therein, for utilizing localized and highly intense melting and refining action within the furnace from the standpoint of the metals and materials that are utilized in the melt and the slag and, in such a manner, as to isolate the heating action from the standpoint of the walls and roof of the furnace, and for making possible the adaptation of at least some novel discoveries of my invention to a conventional open hearth furnace with a minimum of modification thereof.

These and other objects of my invention will appear to those skilled in the art from the illustrated embodiment and the description which follows.

In the drawings:

FIGURE 6 is a longitudinal sectional view in elevation on the scale of FIGURE 5 and taken along the line VI—VI of FIGURE 5;

FIGURE 8 is a top plan view on the scale of FIGURE 5 of a preliminary treatment zone or area of my pre-heating system;

FIGURE 9 is a longitudinal section in elevation on the scale of and taken along the line IX—IX of FIGURE 8;

FIGURE 10 is a greatly enlarged end section in elevation taken along line X—X of FIGURE 8;

FIGURE 10A is an end detail in elevation showing lateral skirting used with the apparatus of FIGURE 10;

FIGURE 13 is a somewhat fragmental plan view taken in front of the furnace illustrated in FIGURE 1, and particularly illustrating a working floor and means thereon for charging the furnace, both with molten metal and with scrap material;

FIGURE 14 is a side view of the scrap charging machine or apparatus illustrated in FIGURE 13, showing details of its construction and on an enlarged scale with respect to said figure and on a comparable scale to FIGURES 11 and 12; in this figure, scrap material is being charged into the furnace from a container or pot;

FIGURE 15 is a fragmental plan view, slightly enlarged with respect to FIGURE 14, showing details of means employed with the machine of FIGURE 14 for gripping the scrap container preparatory to lifting it into a charging position with respect to a furnace;

FIGURE 16 is a top plan view on an enlarged scale with respect to FIGURE 14, showing the apparatus of FIGURE 14 in a scrap container pick-up position, as distinguished from the furnace charging position of FIGURE 14;

FIGURE 16A is a slightly enlarged fragmental view showing a detail of the construction of FIGURE 16;

FIGURE 17 is a side view in elevation on the scale of and of the apparatus of FIGURE 16;

Figure 1:
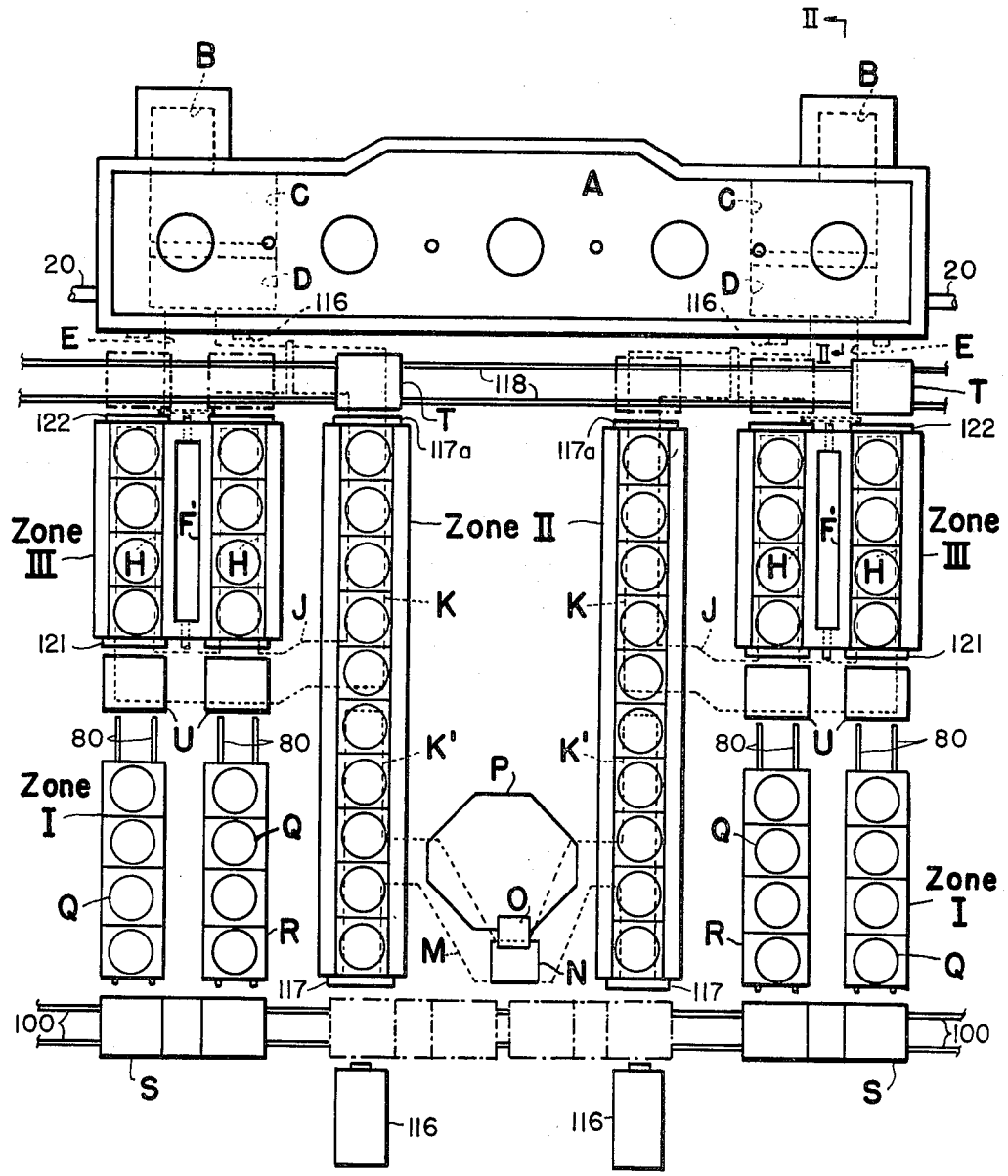
FIGURE 1 is a greatly reduced somewhat schematic plan view of an open hearth furnace layout or system constructed in accordance with my invention and as employed with a scrap pre-heating system also constructed in accordance with my invention.

In accordance with the concept of my invention (see FIGURES 11 and 12), I introduce scrap material into an open hearth furnace A through a group of charging openings in its roof, in order to build-up somewhat cone-shaped piles W on the hearth at locations between the front doors of the furnace. This build-up may be effected in such a manner that the top of each pile W lies close to but in a spaced relation with the roof of the furnace; it is accomplished in such a manner as to provide a longitudinally spaced-apart group or series (at least a pair) of scrap piles W along the extending hearth which, between them, define basin, sink or melting areas on the hearth.

Molten pig iron may be introduced through the front charging doors on the hearth areas between the scrap piles W. Oxygen lances 26 are introduced through the roof to project downwardly toward the melting or sink areas, substantially centrally between the scrap piles, into a cooperating relation with molten pig iron that surrounds such piles. The refining action is effected by injecting or blowing-in substantially pure (commercial grade) oxygen through the lances and effecting an exothermic heating of the melt and a gradual melting down of the piles of scrap W about their bottom or base peripheral areas that are surrounded by the molten metal. It will be noted that the exothermic heat generated is directly absorbed by the scrap. The gases, fumes or reaction products are exhausted from the furnace adjacent at least one end thereof and, as an optimum, adjacent both ends thereof during the refining operation.

It will thus be apparent that the conventional checkerwork system of an open hearth furnace is no longer needed, but that it may be employed for exhausting the gases from the furnace. It is also apparent that hot gas out-flow from the furnace will be in reduced volume from the standpoint of a conventional open hearth operation, since two outlets are available, and since the volume of gases for effecting the refining operation are materially lessened. The localized application of a group or plurality of heat-producing agencies (lances) gives a much more economical and efficient utilization of heat in accomplishing the melting and refining operation and, in combination with the use of the scrap piles, assures the maintenance of the walls and roof of the furnace in a relatively cooler condition.

In the above connection, I have determined that scrap piles which are being melted-down by oxygen injection and the exothermic heating action, act to directly absorb heat and as coolants, particularly above the melt line. This absorption of heat, as it is generated, prevents the build-up of any excessively high temperatures in the molten metal as well as on the refractory lining. Since the requirement for reversal of flow of gas or oil vapor fuel and pre-heated air from one end and of exhaust gas flow from an opposite end of the furnace has been totally eliminated, checkerwork and reversing valve equipment are no longer necessary. In addition, the greatly reduced volume of exhaust gases which are now continuously exhausted, permit the use of much smaller down-takes. By reason of the elimination of the need for reverse flow usage of end checkerwork, and the use of a continuous exhaust flow of gases, I have been able to maintain an even temperature in the slag pockets to keep the slag liquid at all times, so that the slag can be easily and frequently removed or substantially continuously drained. The latter makes possible a reduced size of the slag pockets.

From the above, it will be apparent that basic principles of my invention may be easily adapted to a conventional open hearth furnace with a minimum of modification. That is, the conventional front doors may be retained, along with the conventional molten metal charging machine, and the down-takes may be employed for the continuous exhaust of hot gases. Thus, it will only be necessary to effect a minimum change of the furnace, to provide it with roof doors for charging the scrap, and with lance openings for introducing the oxygen lances.

However, for maximum efficiency and economy of operation and an optimum utilization of the principles of my invention, I prefer to eliminate the conventional end-positioned down-take and the connected checkerwork and reversing valve equipment. In place thereof, I use modified down-takes in the back wall of the furnace, adjacent its opposite longitudinal ends, which are relatively smaller than the conventional down-takes, and which are connected to relatively smaller slag pockets and to a duct or tunnel system that is utilized for pre-heating the scrap material by passing the hot exhaust gases therethrough, to give the scrap a temperature in the neighborhood of 1500 F. or below a temperature at which the scrap material becomes tacky or tends to stick together, before it is charged into the furnace. In this manner, I can employ exhaust heat of one melting and refining operation for pre-heating the scrap charge of succeeding melting and refining operations.

In addition, the foreplate of the furnace may be raised to an elevation of about four feet, six inches above the charging floor to eliminate all door sill banking, and the use of the port ends of the furnace to lengthen the hearth will provide an increased furnace volume or capacity which, among other things, permits the use of a modified sloping front wall with a resultant more shallow bath.

An operation in accordance with my invention still maintains the advantages of permitting the inspection of the melt. In this connection, some front peep holes 17 may be provided for inspection and fettling and, as in the case of the conventional open hearth furnace, I can take test samples of the melt during the melting operation. This is distinguished from the necessity of making guesses as to the operation in an oxygen converter, by noting the type and quantity of the fume and flame being exhausted, and by thermal-electronic temperature recording means, etc. Further, in employing my invention, the front doors may be made relatively smaller or only of a sufficient size for introducing the molten pig iron by means of a conventional charging machine.

In providing a full use of the effective length of the furnace by eliminating the conventional end-positioned down-takes and providing back-wall down-takes, etc., as above outlined, I have been able to materially increase the capacity of the furnace and its hearth, so that for a furnace having a conventional length of about eighty-seven feet, I can increase the number of scrap piles from three to five and the number of sinks or melting basins between scrap piles from two to four along the length of the furnace.

Heretofore, it has been advantageous in an open hearth operation to maintain a relatively shallow depth of molten metal on the hearth, in order to maximize the effect of the somewhat indirect transfer of heat from the above-circulating hot combustion gases through the slag to the metal. In accordance with my invention, since heat is directly introduced in the molten metal through the agency of localized oxygen jets or blows which tend to open up paths through the slag blanket and which cause a direct heat generation in the metal of the molten bath, I have been able to make practical and economical use of relatively greater depths of molten metal. In this manner, I increase the refining capacity of the furnace without increasing the time periods involved.

Since an open hearth furnace has a relatively low overhead height, as compared to an oxygen converter vessel of somewhat comparable refining capacity, I can build-up scrap piles on the hearth without danger of damaging it, since the drop is much less than involved in feeding an oxygen converter. In addition, I make possible the utilization of a group (at least a pair) of spaced and molten-pool-aligned relatively smaller oxygen lances for a given tonnage capacity of metal, such that the melting operation may be more closely controlled and the heat generated in the lances may be less intense than where dependence is placed upon a single large lance of greater oxygen capacity or a group of relatively closely adjacent lances.

Employing my optimum operation in which exhaust gases generated by the furnace are employed to pre-heat and are preliminarily passed to scrap charges that are to be introduced into the furnace, I not only utilize otherwise waste heat, but additionally, reduce the temperature of the gases from their normal approximate 3000° F. furnace temperature to a temperature in the neighborhood of about 300° to 400° F. which makes them suitable for direct discharge into a stack. It also makes possible the use of a flow inducing fan adjacent the stack and a precipitator, without the employment of a spark trap and cooling means such as water spray jets, etc. In addition, by moving the exhaust gases through the interstices or pores of the scrap, I accomplish a cleaning or straining-out action as to dust particles, such that such particles which may include valuable metal oxides, are returned to the furnace when the scrap is charged, and such that expensive cleaning equipment is not needed before the gases are discharged into the atmosphere.

Further, in accordance with the optimum employment of my invention, the hot gases exhausted from the furnace are applied to the scrap material in a final pre-heating zone, while the partially-cooled gases of such a treatment are then taken off and used in a preliminary pre-heating zone for cold scrap material, such as taken from a storage yard.

By way of illustration and not of limitation, I have found that it is advantageous to pre-heat the scrap before its introduction into the furnace (which may include ores and metal scrap materials in a solidified condition) to a temperature just below the temperature at which the materials will tend to stick together. When the scrap materials are introduced into the furnace, then a preliminary fuel and oxygen burning may be effected, in accordance with my optimum method, through the oxygen blow lances or by employing supplemental lances, if desired. The preliminary flames thus engendered are then maintained for a short period until the materials of the lower reaches of each scrap pile are at least slightly melted to define fairly impervious or liquid tight basins up to the level of the contemplated introductions of the molten pig iron metal (see X of FIGURES 24 and 25). After the molten pig iron is introduced, then the fuel gas flow may be shut-off and pure oxygen gas jets used to start and maintain the refining action and scrap melting incident thereto. The oxygen jets refine the molten metal of the pools and make use of exothermic heat generated by burning impurities, such as carbon, silicon, sulphur, etc., to generate heat for melting the scrap. By employing a preliminary fuel burning operation for a slightly longer period, I can make use of a higher percentage of scrap material charge (approaching a full or 100% scrap charge). With such a type of charge, I complete the melting and refining operation by the employment of fuel and oxygen gas jets, using lances. This provides an oxygen-fuel melting operation. If desired in this connection, additional oxygen fuel lances may be introduced through the roof doors to provide a direct alignment of their flames with the scrap piles.

Slag producing materials such as lime, iron ore, etc., may be introduced in any suitable manner, such as through the front charging doors, in a pre-heated condition with the scrap, through the roof openings or in a granular or powdered condition through the oxygen lances. I have found, as distinguished from oxygen blowing in a converter vessel, where about 90% of the affluent immediately leaving the mouth of the vessel consists of carbon monoxide gas, thus necessitating a further burning in the hood to lower the carbon monoxide gas content below explosive limits by the introduction of air, that by employing my process, about 90% of the gas affluent exhausted is in the form of carbon dioxide gas. This is assured by the use of a slight excess of oxygen and by the use of a plurality of lances spaced longitudinally along the length of the furnace.

In accordance with my invention, there is thus a substantially complete combustion of carbon monoxide gas by the time the affluent or hot exhaust gases reach the slag pockets. Howover, if desired, a pipe or lance 20 may be projected through the front corner of each of the end walls of the furnace (see FIGURES 11 and 12) at a point adjacent its exhaust down-takes as a further assurance of complete combustion at the outlet ports. Further, where my scrap pre-heating system is employed, a small amount of cooling air may be introduced into the gases before they are passed through the scrap in the final pre-heating stage or zone to assure the desired temperature of the scrap for handling and introduction into the furnace.

To assure a flow of the exhaust gases through the scrap materials in the pre-heating zones, in the sense of passing them between particles and along pores or interstices of a pile of scrap. I employ containers or pots Q (see FIGURES 6, 7, 9 and 10) which have open top ends or mouths and retaining bottoms provided with flow ports or passages therethrough. Thus, the hot gases can be flowed downwardly or upwardly through a particular charge of scrap material with minimum interference. To retain the heat of the charge when the pot or container Q is moved or elevated out of its treatment or holding zone, I provide a lid 55 which, instead of being carried by the container or pot, is carried by a lifting apparatus or machine 35 (see FIGURE 14) in such a manner as to cover the open-mouth upper end of the pot or container and maintain it covered during the lifting operation and to only uncover it when the container is tilted for delivering the scrap through an opening in the roof of the furnace. Also, the scrap charging machine or apparatus is of a type suitable for use with and secure connection to a conventional floor charging machine, so as to simplify charging equipment of the installation, to make maximum use of existing conventional equipment, to make possible control from the same pulpit as controls the operation of the conventional charging machine, and to provide a counterweight or ballast for the lifting arm of the scrap charging machine.

I have determined that a scrap container or pot Q of cylindrical shape of about five feet, six inches in outside diameter and thirteen feet in height will develop a capacity of about two hundred and sixty (260) cubic feet of scrap of an estimated total weight of up to about ten tons (seven to eight tons is a good operating weight), that the pot or container may be swung from a floor position in front of the furnace to a discharging position in about one minute, and that the scrap may be charged in about another minute to give a total charging period of about two minutes. In addition to fast scrap charging and prompt addition of molten metal, I have found that it is possible to cut the present usual nine hours plus heating time down to well below about three hours. Where the scrap material is pre-heated in a manner, such as above-mentioned, using scrap boxes or pots Q of the approximate dimension, also as above-mentioned, I have found that about eight boxes or pots are sufficient for each end pre-heating layout of the furnace to provide about a 50% scrap charge for a two hundred and forty (240) ton furnace. This will make sixteen pots available, since two pre-heating layouts are shown; if each pot contains about seven tons of scrap material, this makes available about one hundred and twenty (120) tons which can be charged into the furnace in about thirty-two minutes. Incidentally, each stacked pile may accommodate about forty tons of scrap material and no size selection or gradation is required. I have found that it is advantageous to provide about ten pots or containers at a preliminary or lower temperature pre-heating zone or stage II and to use about eight in a final zone or stage III; the two additional pots of the preliminary stage or zone thus give flexibility for any additional scrap needs of a particular furnace charging operation.

Although cold scrap may be utilized for the scrap piles W of the furnace, it is apparent that the operations is much more effective and economical when pre-heated scrap is utilized. Also the pre-heating may be effected by any suitable means, such as by apparatus described in the Brooke U.S. Patent No. 2,804,295, as may be convenient or desirable for a particular installation. However, it will also be apparent that the direct use of exhaust gases from the furnace is a much more economical way of effecting pre-heating and has the further advantage of filtering the exhaust gases and cooling them, so that they may be directly passed through a precipitator and a fan apparatus into the stack, without complex spark trap, cooling and cleaning equipment which would otherwise be necessary.

*Furnace and gas flow system*

Figure 2:
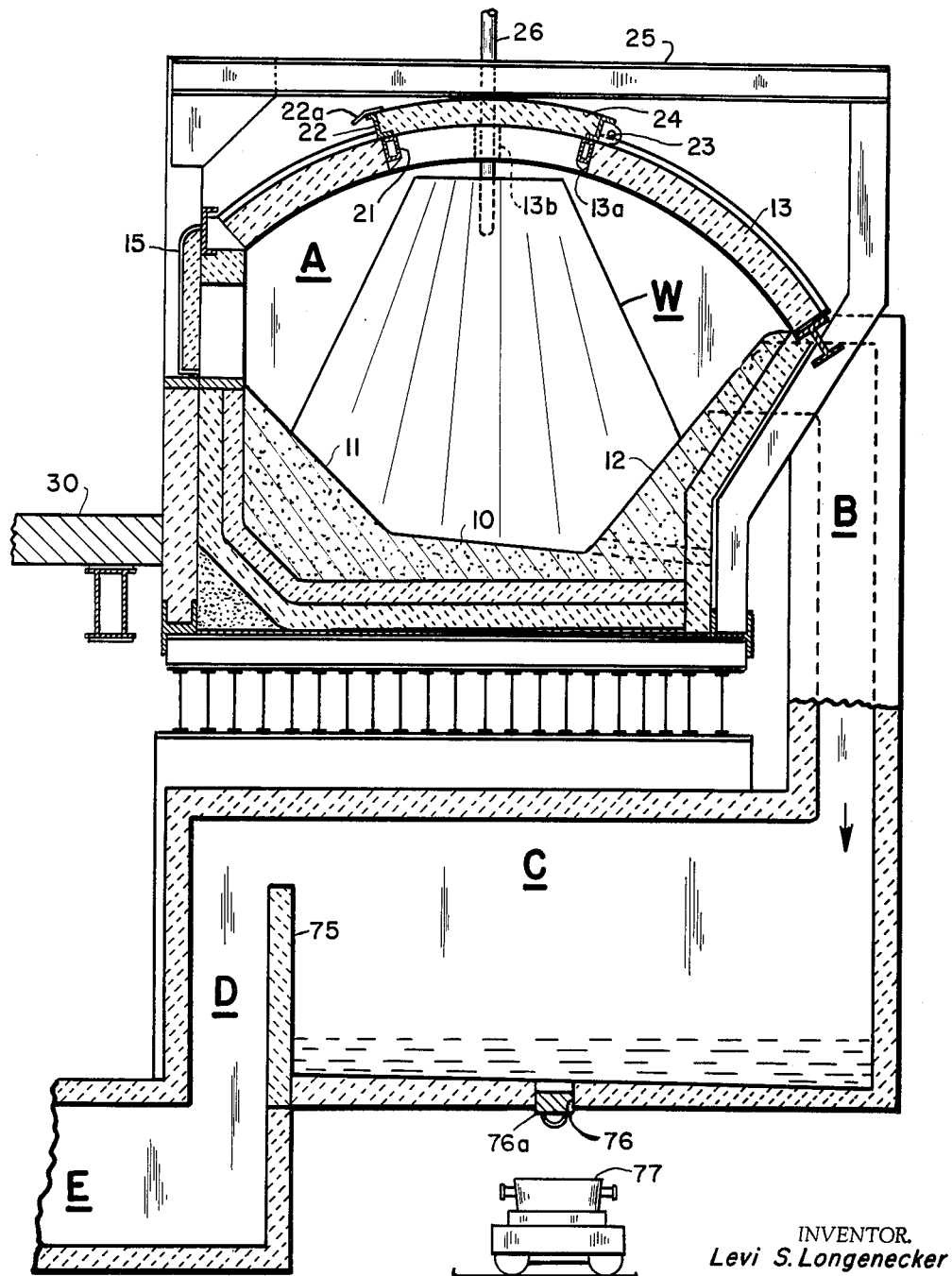
FIGURE 2 is an enlarged transverse section in elevation of the furnace of FIGURE 1, taken along the line II—II of FIGURE 1.

Referring particularly to FIGURES 1 and 2 of the drawings, it will be noted that exhaust gases from the furnace A pass through down-takes B which are located adjacent opposite ends of the furnace, but which extend through the back wall or banking of the furnace adjacent such ends. The flow is into slag pockets C, over a bridge wall 75 in each slag pocket, into an out-flow tunnel D.

Figure 3:
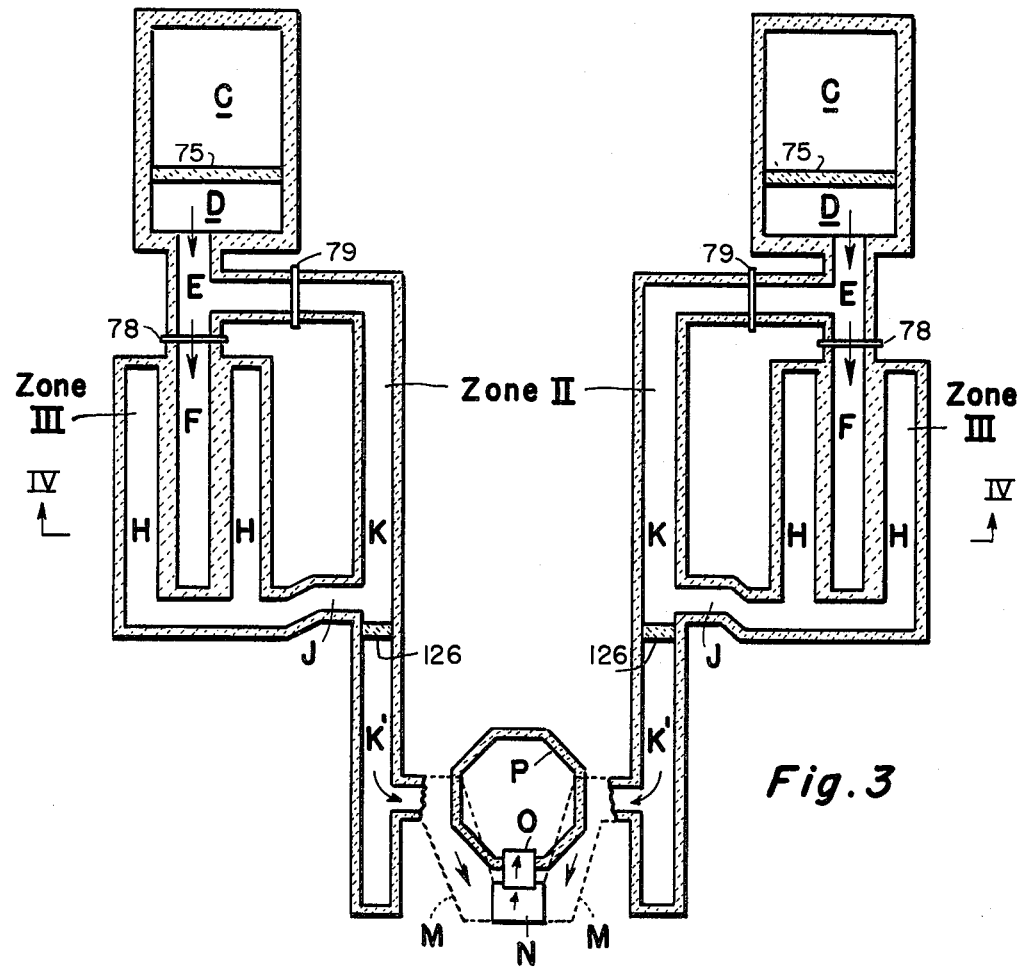
FIGURE 3 is a somewhat diagrammatic reduced plan view on the scale of FIGURE 1 illustrating a gas flow system of my invention including pre-heating zones for scrap material.

It will be noted from FIGURE 3 that the tunnel system shown connected to each end portion of the furnace is the same and, for this reason, it will be only necessary to describe one of them.

Figure 4:
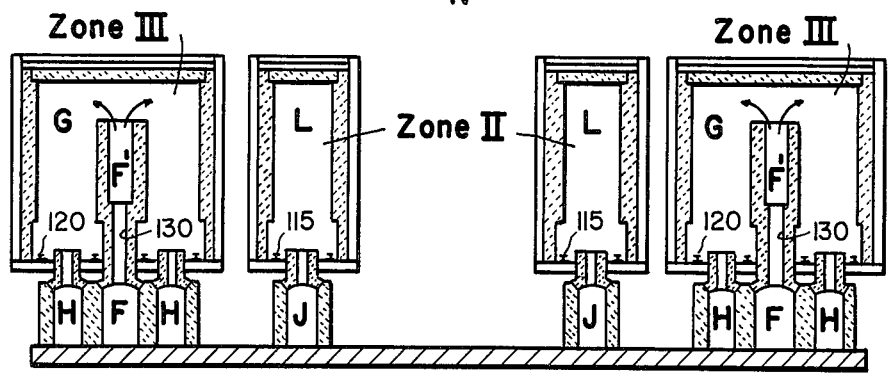
FIGURE 4 is a slightly enlarged transverse section in elevation taken along the line IV—IV of FIGURE 3.
Figure 7:
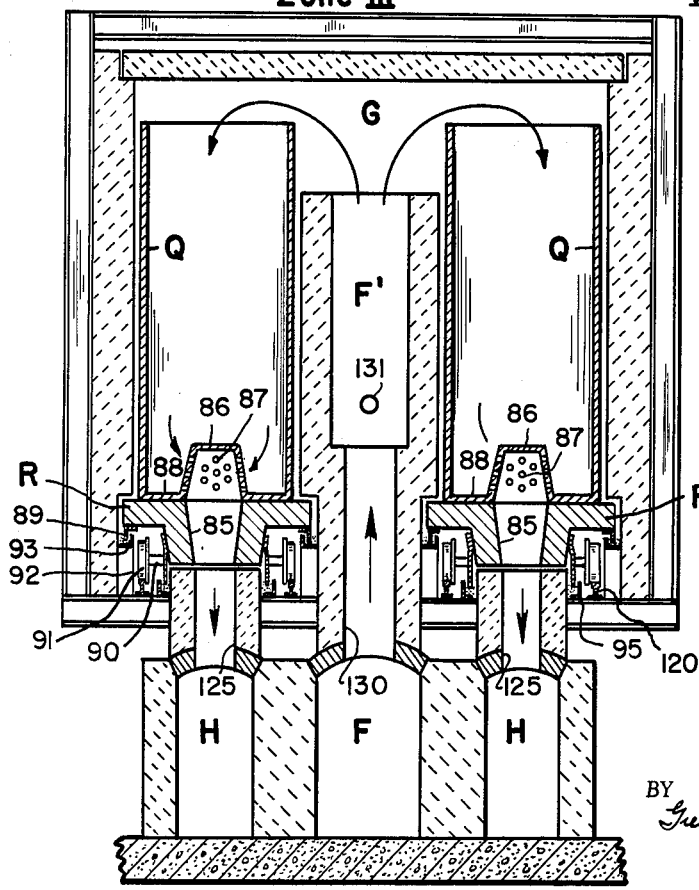
FIGURE 7 is a transverse or end section in elevation on the scale of and taken along the line VII—VII of FIGURE 5.

From the out-flow tunnel D, the gases pass into a main out-flow connector tunnel or duct E which has a direct connection through a damper valve 78 to a final treating or pre-heating zone III, and through a branch duct or connection and damper valve 79 to a preliminary treating or pre-heating zone II. Although the branch duct or connection of tunnel E provides for any suitable tempering of the gases in zone II, the main flow will be directly into zone III, and particularly into a centrally-located longitudinally-extending tunnel F thereof. As shown in FIGURES 3, 4 and 7, the hot gases from the central tunnel F flow centrally-upwardly into an enclosed heat treatment chamber G of zone III, and downwardly through the bottom portions of opposite pots Q in the treating chamber G into side tunnels H. The tunnels H are employed to flow the hot gases, after they have treated scrap material in zone III in chamber G, to a common outlet or exhaust tunnel J (see FIGURE 3). The exhaust tunnel J of zone III is shown connected to a front end of a tunnel K for zone II; the branch line of the main flow tunnel E is shown connected to the opposite or back end of the tunnel K through the damper valve 79.

As shown particularly in FIGURES 1, 3, 4, 8 and 9, gases entering the tunnel K pass upwardly through pots Q into a treating chamber L, along a back half portion of zone II, and then downwardly through pots Q from the chamber L through a front half portion of zone II into a front tunnel K' and through an exhaust tunnel M, a precipitator N (see particularly FIGURES 1 and 3), and an induction fan O, into a stack P.

It will thus be seen that hot exhaust gas flow is first effected through scrap material carried by pots or containers Q in final treatment or high temperature zone III. The gases are then passed from zone III into zone II, where the now partially-cooled exhaust gases flow through cold scrap material carried in pots or containers Q in such zone to impart a preliminary heat thereto. From the preliminary treatment zone II, the gases are shown as passing through a precipitator and induction fan into the stack P, where, as shown, the hot exhaust gases flow from adjacent both ends of the furnace A, and the illustrated number of scrap material carrying pots or containers Q are provided for the system. I have been able to finally condition scrap in sixteen containers in the two zones III and the scrap in twenty containers in the two zones II.

*The furnace construction*

Figure 11:
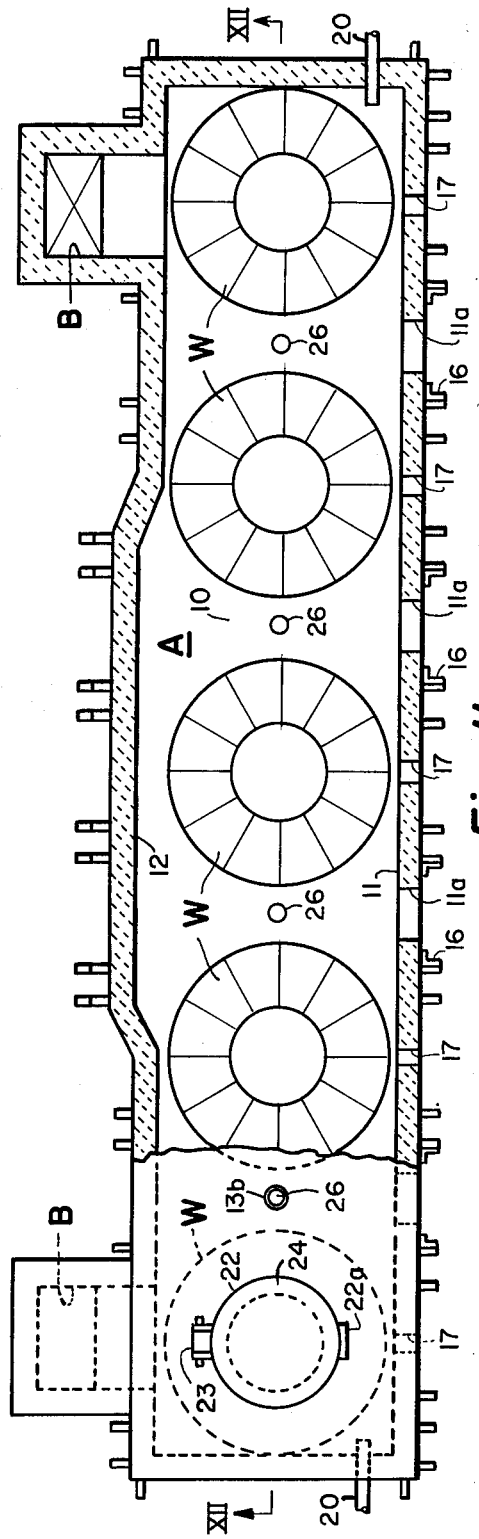
FIGURE 11 is an enlarged top view in elevation of the furnace structure shown in FIGURE 1 and illustrating the furnace as charged with scrap piles in acordance with my invention.
Figure 12:
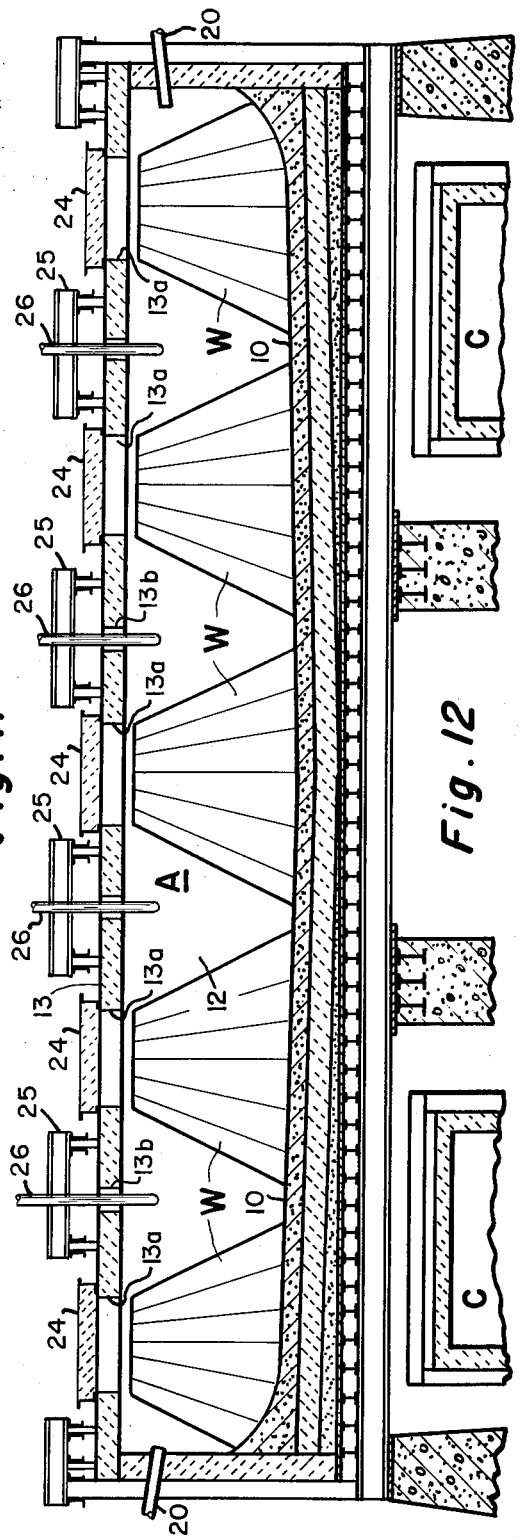
FIGURE 12 is a longitudinal sectional view in elevation on the scale of and taken along the line XII—XII of FIGURE 11; this view illustrates the furnace before hot metal, such as hot pig iron, has been charged therein and after the scrap material has been charged.

Referring particularly to FIGURES 2, 11, and 12, the furnace A is shown provided with a hearth consisting of a bottom portion 10, a front bank portion 11 and a back bank portion 12 through which the down-takes B extend. The furnace A also has an arched roof 13 provided with a series of open, scrap charge-feeding portions 13a in a spaced relationship with each other along the length of the roof, and a group of lance by-passing open portions 13b also in a spaced relation longitudinally of the roof and between the open feeder portions 13a. Charging door openings 11a are provided in a spaced relation longitudinally along the front wall 11 of the furnace A and have suitable slide doors 15 (see FIGURE 2) which may be raised and lowered in a conventional manner along guides 16 (see FIGURE 11). Peepholes 17, which may be closed with mica or the like, are shown provided in the front wall of the furnace A in substantial alignment with the charging openings 13a in the roof. Lances 20 are shown extending into the furnace adjacent end corners of the front wall for supplying additional oxygen or air to assure a complete combustion of the carbon monoxide gas before the exhaust gases leave the furnace and pass through the down-takes B into the slag pockets C.

As illustrated in FIGURES 2 and 14, each open portion 13a is shown provided with an annular water jacket 21 about its peripheral edge. An annular cover or lid-supporting frame 22 is secured by a pivot mounting 23 to the jacket 21 to provide a concentric sealing engagement therewith for normally closing-off each feed open portion 13a. The frame 22 carries refractories to define a closed lid 24 that may be lifted to an open position by a lift lug 22a. A support and aligning structure 25 is shown provided for each oxygen lance 26 which may be raised out of and lowered into the furnace A through an associated opening 13b by any conventional means, see, for example, the means of FIGURE 1 of the McFeaters Patent No. 2,822,163.

*Furnace charging apparatus*

Referring particularly to the plan view of FIGURE 13 of the drawings, I have shown a conventional front track 32 extending longitudinally in front of the furnace A for carrying a conventional floor charging machine 33 for movement therealong into and out of an aligned relation with front charging openings 11a. A roof charging machine 35 is also shown mounted for movement along the track 32 and connected by suitable secure, detachable connections 34 to the floor charging machine 33. It will thus be seen that the motor drive for the conventional machine 33 and the conventional pulpit controls therefor may thus be used for moving the roof charging machine 35. For simplicity of illustration, the usual track for scrap cars between the track 32 and the furnace is not shown.

Referring particularly to FIGURES 14 to 17 of the drawings, I have shown details of the construction and operation of the roof charging machine 35. Wheels 36 of its platform 35a are adapted to move along the track 32 in the manner above indicated. A reversing electric motor 37 is shown mounted on the platform 35a and operatively connected through its shaft and a coupling (see particularly FIGURES 16 and 17) to drive a gear reduction unit 38. A slow speed shaft 38a is driven by the unit 38 and, as shown, carries a pair of pinion gears 39 in a keyed-on or secured relation with respect thereto. The pinion gears 39 mesh with and drive a pair of driven gears 40 which are keyed, splined or secured to a cross drive shaft 41 that, adjacent its opposite ends, is journaled within bearing stands 42. A pair of longitudinally-projecting frame arms 44, at their lower or mounted ends, are secured or splined on the drive shaft 41 for swinging movement forwardly-downwardly beyond the track 32 when a scrap container or pot Q is to be picked-up from an elevator (see FIGURE 13), and then for backward-downward swinging movement beyond the track 32, see FIGURE 14, when the scrap content of the container Q is to be discharged into an opening 13a of the furnace A.

The frame arms 44, at their front or extending end portions, have a mounting platform or transverse connecting member 45 extending therebetween (see particularly FIGURE 16) for supporting and operatively carrying means for clamp-engaging a container Q, substantially centrally of its height, for covering or closing the container with the lid or cover 55, and then for raising and tilting the closed-off container to a charging position and moving the cover 55 to an open position with respect to the open mouth of the container at such charging position (see FIGURE 14). A pair of clamping or gripping arms 46 are pivotally mounted on the platform 45 by pins 47 and, at their outer ends (as shown particularly in FIGURES 15 and 16), have clamping jaw portions 46a of curvilinear shape to engage in an opposed relation against opposite sides of the container Q. The gripping arms 46 are actuated by a reversible and position-locking motor 50 that is mounted on the platform 45 and connected through a drive shaft and a coupling (or an electric brake) to a reduction gear unit 51. The unit 51, as particularly shown in FIGURES 16 and 16A, has a drive output shaft 52, on the upper end portion of which is secured a rotatable disc 52a. A pair of drive or swing arms 53 are pivotally-mounted at their inner ends on the disc 52a in a spaced, off-centered relation with respect to the shaft 52 for actuation by rotation of the disc. The outer end of each drive arm 53 is at 54 pivotally-secured to or mounted on a substantially immediate length portion of an associated clamping or gripping arm 46 for moving it into and out of a secure holding relation with a scrap container Q, about the end pivot point or pin 47.

The cover 55 is carried by a pair of swing arms 56 which are secured at their outer ends thereto and which, at their lower ends, are pivotally mounted on pins 57 that project from bearing mounts 58 that are secured on the outer sides of the pair of frame arms 44. The lid or cover 55 is swung into and out of a closing relation with the open end of the container Q by the swinging movement of the arms 56. With particular reference to FIGURES 16 and 17, means for swinging the arms 56 includes a reversible and position-locking electric motor 60 that is connected through a drive shaft and a coupling (or an electric brake) to a gear reduction unit 61. A drive shaft 62 of the unit 61 is journaled within bearing mount 63 on the platform 45 adjacent its outer end, and carries a beveled gear 64 that meshes with a beveled gear 65 of a cross-positioned drive shaft 66. The shaft 66 is journaled adjacent its opposite ends within bearing mounts 66a that are positioned on the platform 45. A crank 67 is secured on each extending end of the cross drive shaft 66. Each crank 67 of the pair carries a crank pin 68 on which a cover-actuating arm or member 69 is pivotally mounted at one end thereof. It will be noted from FIGURE 16 that there are a pair of the arms 69 and each, at its other end, is pivotally connected by a pin 70 to a mount 56a that projects from an associated swing arm 56. The arms 69 (see also FIGURES 14 and 17) are connected to their associated swing arms 56 adjacent to but spaced forwardly from their inner ends for swinging them on their pivot pins 57 and thus, swinging the lid 55 to and from a closed relation with respect to the container Q.

From the above, it will be apparent that the motors 37, 50 and 60 may be operated through suitable electric connections by a remote control pulpit, to not only swing the pair of support arms 44 from a container pick-up position to a container discharge position, but also to swing the lid 55 on the pair of swing arms 46 from a container-covering to an open, furnace-charging position (see FIGURE 14). In this manner, the heat of a pre-heated scrap charge may be better retained within the container Q and accidental discharge of the scrap material will be prevented during the lifted and swinging movement of the container Q.

*The pre-heating system*

Referring particularly to FIGURE 2, it will be noted that hot gases leaving the furnace A through the downtake B will move through the slag pocket C and over a bridge wall 75 to flow into the tunnel D. Slag carried into the slag pocket C may be removed therefrom through an opening 76 in the bottom thereof and collected by any suitable means, such as a slag car 77; a lift-out plug 76a is shown for closing the opening 76. Referring particularly to FIGURES 1 and 3, the hot gases will normally flow from the take-off tunnel D through the tunnel E and past the damper 78 which will normally be in an open position. On the other hand, the damper 79 will be normally in a closed position or possibly in a slightly open position, depending upon the amount of tempering desired in zone II.

A storage area or zone I is shown provided in FIGURE 1 with a plurality of scrap material-receiving pots or containers Q. In this connection, two spaced-apart pairs of forwardly-longitudinally-extending track rails 80 are provided for receiving service trucks R on which the containers Q are carried. The containers Q may be filled with cold scrap material in the usual manner, as by an overhead crane with a bucket, a chute, etc. Scrap containers in the storage zone I are maintained in filled condition and are held in readiness for use respectively in the pre-heating zones II and III. With reference to zone I, for the purpose of keeping the pots or containers Q hot, I also contemplate enclosing this zone and subjecting it to the flow of exhaust gases from zone II. In this connection, the normal flow from zone II into tunnel M may be directed to zone I and from zone I into the precipitator N. The hot gas will merely be circulated about the pots Q and not through them, to keep the pots hot and impart some pre-heating to the scrap container therein.

Figures 20, 21:
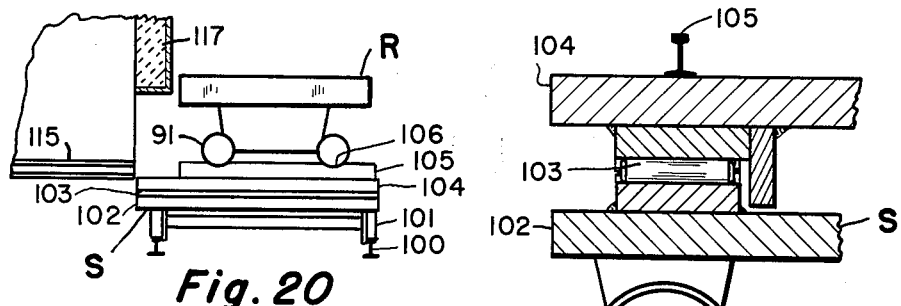
FIGURE 20 is an end view in elevation of a truck for supporting a scrap container as positioned on the service truck apparatus of FIGURE 19.
FIGURE 21 is a greatly enlarged fragmental side view of the service truck of FIGURES 18 and 19, particularly illustrating roller means for its movable upper table.

As illustrated particularly in FIGURES 7, 10 and 20, each service truck R has a relatively planar upper platform for receiving a container Q in a supported relation thereon for movement throughout the different zones or areas of my system. Each truck R also has a central, open passageway 85 through which the hot gases are to be passed. Each container or pot Q has an upwardly-offset, somewhat frusto-conically-shaped, central bottom portion 86 that is provided with spaced-apart ports or openings 87 through its peripheral side walls to pass hot gases therethrough. It will be noted that the bottom portion 86 is adapted to be positioned in alignment with and over the open passageway portion 85 of the truck R, so that gases will flow through the openings 87 into and out of the passageway 85. The substantial horizontal top of the bottom portion 86 is shown closed, in order to support the scrap material, along with a surrounding, downwardly offset, horizontal, closing wall portion 88.

Each truck R carries a pair of front and back positioned shafts 90, on each of which a pair of flanged wheels 91 are mounted to ride on a track, such as the track 80 of zone I. In heat-treating zones II and III, similar side structures 92 are provided along their tunnels and have longitudinally extending angle pieces 93 for carrying sand seals. The container service truck R has longitudinally extending side angle members 89 whose bottom flanges project into the sand seals provided by the members 93, see particularly FIGURE 10. These sand seals seal-off chambers (such as L of FIGURE 10) adjacent bottom reaches of the platform of each service truck R.

In addition, each service truck R has a pair of longitudinally extending, flexible, heat-resistant, side skirts 94, such as of metal, secured at their upper ends thereto and projecting downwardly therefrom into lower sand seals defined by longitudinally extending pairs of angle pieces 95 which are mounted on the structural framework of a corresponding tunnel. It will be noted that the skirts 94 project across a joint formed between the passageway portion 85 of each car R and an upper surface of a gas tunnel to seal-off such joint when hot gases are being flowed into and through the containers Q. In addition, each truck R has a pair of end skirts or flaps 96 of flexible, heat-resistant, material which project downwardly therefrom (see FIGURE 10A) to further aid in sealing-off such joint.

When a filled scrap car Q is needed in preliminary treatment zone II, it is moved forwardly on its track 80 in zone I to an adjacent position with respect to a front-positioned longtudinal track 100 (see FIGURE 1). The track 100, adjacent each end, carries a self-propelled (electric motor driven) service truck S which, as shown in FIGURES 1 and 19, may have two movable or slide platforms 104 for receiving a scrap car Q and its truck R from each of the lines of the storage area I. In this connection, the truck S, as shown particularly in FIGURES 18 and 19, has flanged wheels 101 that are adapted to move along the track 100, a bottom stationary platform 102 having a roller system 103 for carrying an upper, movable platform 104 on which short sections of track 105 are mounted.

Figure 22:
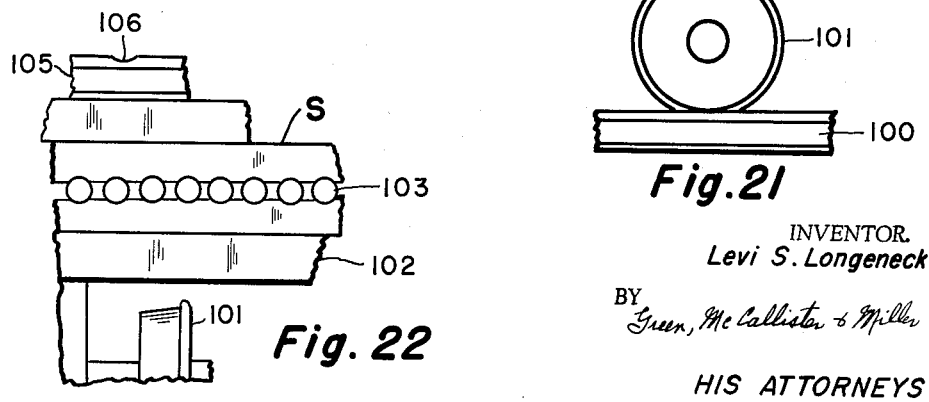
FIGURE 22 is a fragmental end view in elevation on the scale of and of the structure of FIGURE 21, showing ladder bearings or roller means for enabling movement of the upper table.

Each upper platform 104 is adapted to be moved forwardly and backwardly on its roller system 103 with respect to the lower platform 102 to align its rails 105 with the rails 80 of storage area I, so that a truck R may be easily moved onto the rails 105. The rails 105 have grooved stop portions 106 (see FIGURES 18 and 20) for retaining the wheels 91 of an associated container truck R in position thereon. As shown particularly in FIGURES 21 and 22, the roller system 103 may comprise so-called ladder type of rollers (produced by Torrington) for enabling lateral movement of the upper platform 104. An electric motor 107 is adapted to operate each upper platform 104 through a pinion 108 and a gear rack 109, so as to move the rail sections 105 into a close, endwise-cooperating, alignment with rails, such as 80 to receive a scrap container-carrying or service truck R therefrom.

Figure 18:
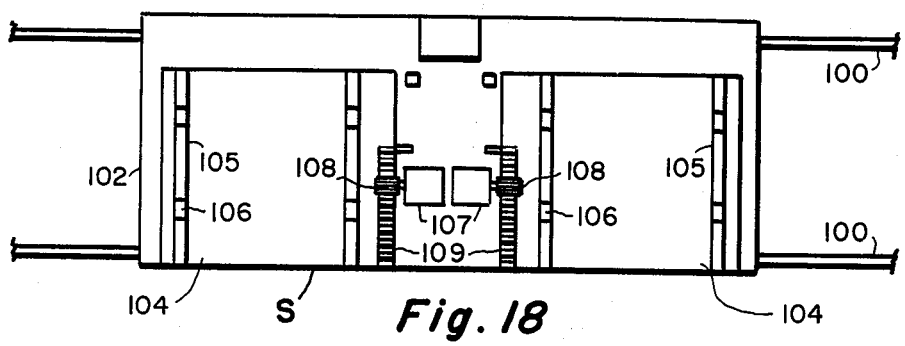
FIGURE 18 is a greatly enlarged plan view of service truck apparatus illustrated in FIGURE 1 for transporting scrap containers and their trucks from a storage area zone to a preliminary treatment zone.
Figure 19:
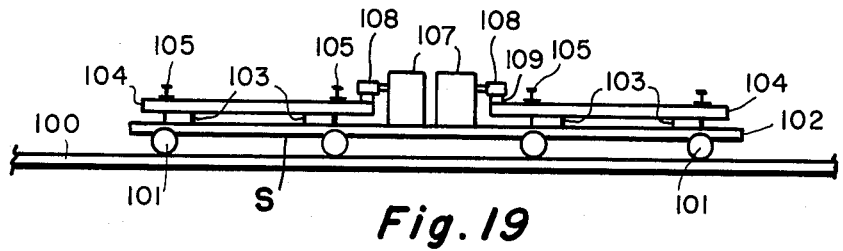
FIGURE 19 is a side view in elevation on the scale of and of the apparatus of FIGURE 18.

As shown particularly in FIGURES 18 and 19, the transfer truck S has two identical, container-truck-receiving platforms 104, so that two containers Q may be carried thereby along the track 100 and successively delivered to track 115 of, for example, the preliminary heating zone II (see FIGURES 9 and 20 taken in view of FIGURE 1). When the transfer truck S is moved from the full line, life-hand position of FIGURE 1 to the intermediate dot-and-dash line position of the same figure, then the track 105 of its left-hand platform 104 may be aligned with a longitudinally extending track 115 of zone II (see FIGURES 8 to 10). The platform 104 is then moved on its platform 102, so that its rail sections 105 are in a close, endwise, alignment with the track 115. Then a pusher 116 may be used to push the container truck R off the track 105 onto the track 115 and into the zone II. In this connection, a refractory-lined, vertically movable front door 117 is raised to permit such introduction of one of the trucks R and its associated scrap-charged container Q. At the same time, an opposite or back, refractory-lined door 117a may be raised to deliver a container Q and its truck R, at the back end of the zone II, to a single-unit, self-propelled (electric motor driven), transfer truck T for transfer to zone III. It will be noted that the track 115 extends fully along the zone II and between its end-positioned, raisable furnace doors 117 and 117a. It will also be noted that track 118 of the two lines of zone II extends fully therealong and between its end-positioned, raisable furnace doors 121 and 122.

A track 118 extends parallel to the front of the furnace A and parallel to the track 100 at the front ends of the zones II and III. It is provided with at least one service truck T of a type similar to the truck S, except that only one container-receiving platform 104 is provided. That is, the truck T has only one upper movable platform 104 and only one set of transverse rail sections 105, as well as one drive motor 107 for moving the platform 104 on the lower platform 102. It, however, like the service truck S, is self-propelled so that it can be moved along the track 118 from alignment with zone II, after receiving a preliminary treated scrap charge, into alignment with one of the parallel lines of zone III and particularly, into alignment with a back end of one of a pair of tracks 120 of such zone. In this connection, when the service truck T, for example, moves from the full-line, right-hand position of FIGURE 1 to one of the dot-and-dash positions, then its platform 104 may be moved forwardly until its track sections 105 align with one of the tracks 120 of zone III. A pusher 116 may then be operated to push the container truck R and its preliminarily heated scrap in container Q sidewise off the service truck T, whose rails are at this time in alignment with the rails of zone III. At the same time, a container Q containing finally treated scrap material, at the extreme front end of the same line of zone III, may be moved onto an elevator U.

The zone III has vertically movable, refractory-lined, end doors 121 and 122 that are raised to permit the movement of the container trucks R in the above-mentioned manner. Each elevator U (like the transfer trucks S and T) has upper and lower platforms 104 and 102, bearings 103, and a suitable drive mechanism for the upper platform similar to the mechanism 107, 108 and 109 described in connection with the service truck S.

Figure 5:
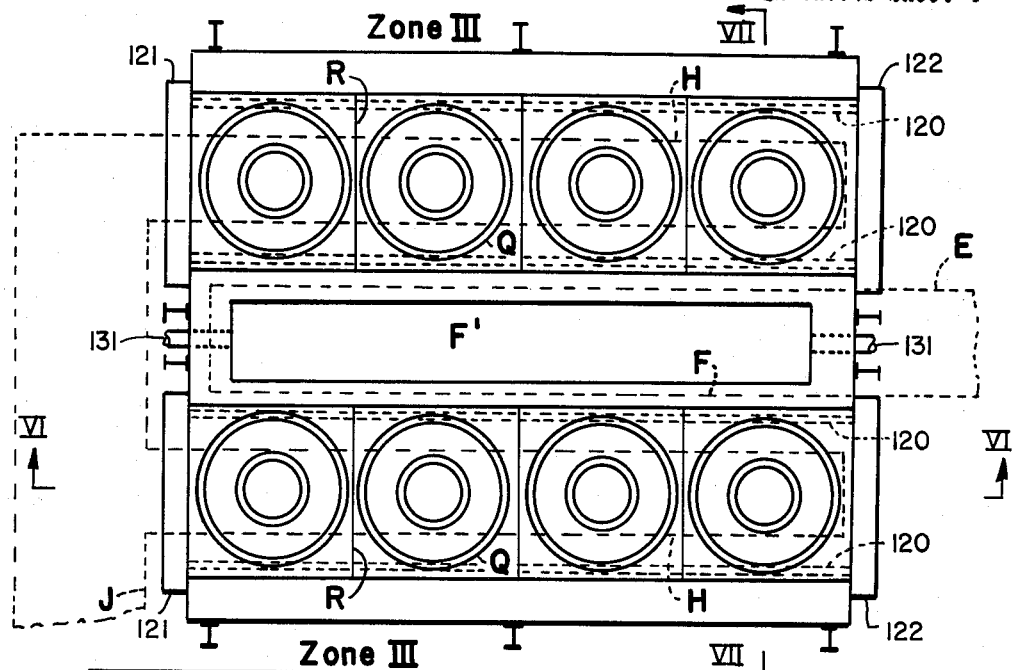
FIGURE 5 is an enlarged top plan view of a final treatment zone of my pre-heating system.
Figure 23:
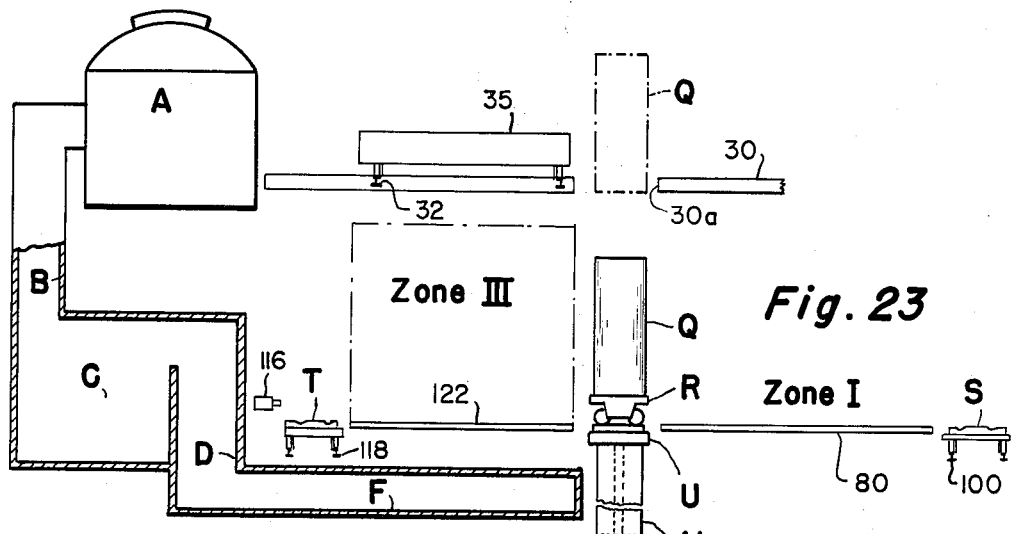
FIGURE 23 is a somewhat diagrammatic side view in elevation on the scale of and illustrating the pre-heating system of FIGURE 1, as well as transfer and elevator apparatus for scrap containers.

After the rail sections 105 of the movable platform 104 of an elevator U have been moved into end alignment with the track 120 (see FIGURES 5 and 7) of one of the lines of zone III and a container truck R has been moved thereon, as shown particularly in FIGURE 23, it may be raised by an elevating mechanism, such as hydraulic mechanism V, from a lower position to an "upper" position substantially parallel with the charging floor 30 of the furnace A. At this position, the previously described charging mechanism 35 may then take the container Q and charge it into the furnace A (see FIGURE 14). When the container Q has been emptied, it is then returned to the truck R on elevator U which is lowered by the mechanism V to its "down" position. At this time, the platform 104 may be moved to the right of FIGURE 23, so as to align its rail sections 105 with inner ends of the rails 80 of the storage zone I onto which it is moved to receive a charge of scrap.

From the above, it will be seen that the containers or pots Q can be moved in a continuous cycle from zone I to zone II and zone III, to an elevated furnace-charging position, to a down position, and finally back to the storage zone I.

FIGURES 3, 4, 8, 9 and 10 show the construction of the preliminary treating area or zone II, where a plurality of scrap containers Q may be longitudinally aligned for moving hot gases through the interstices or pores of the scrap material carried therein. Referring particularly to FIGURE 9, it will be noted that the flow of hot gases from the tunnel J into the tunnel K' is upwardly through a plurality of passageways 125 which were aligned with the passageways 85 in the container trucks R and also with the offset bottom portion 86 of an associated container Q. The hot gases thus pass through the ports or openings 87 in the portion 86 and, as indicated by the arrows, move upwardly through scrap in the container Q, along the top of the zone II (the right half of the construction of FIGURE 9), and to the left past a central partition 126 which separates the front tunnel K' from the back tunnel K, downwardly into the open mouth portions of a left-hand group of containers Q, and downwardly through the ports 87 in their bottom portions 86, downwardly along the passageways 87 and 125 into the tunnel K', and thence, out through the tunnel or duct M.

Referring particularly to FIGURES 3, 4, 5, 6 and 7, the hot gases from the tunnel F of zone III move upwardly through a tunnel passageway 130 into a centrally disposed chamber F' and thence, into the main chamber G. As shown particularly in FIGURE 7, tempering air may be introduced into the chamber F' through a pipe 131 for mixing with the hot gases of chamber F' to provide a suitable desired pre-heat hot gas temperature for raising the temperature of the scrap in the containers Q to a desired final temperature for charging into the furnace A, but which is below a melting temperature of the scrap, e.g., to a tempered gas temperature of about 2500° F. It will be noted that the gases rise through the chamber F' into the chamber G, and then move downwardly towards opposite side portions of the chamber G, through the open mouths of the containers Q and through the scrap therein, through the bottom ports 87 and passageways 85 and 125 into the tunnels H, and from such tunnels, as shown particularly in FIGURE 3, into the tunnel J and zone II.

*The melting*

Figure 24:
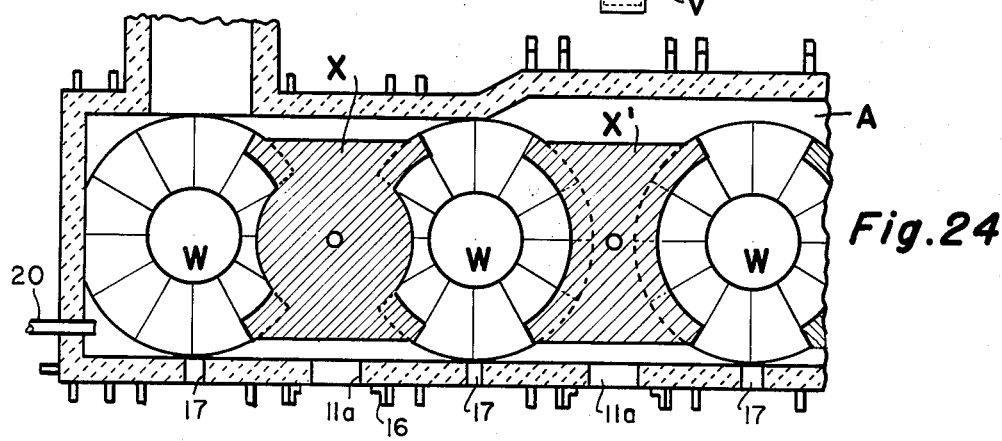
FIGURE 24 is a fragmental top plan view on the scale of FIGURES 11 and 12 of the furnace of FIGURE 1, with its roof removed to illustrate melting procedure.
Figure 25:
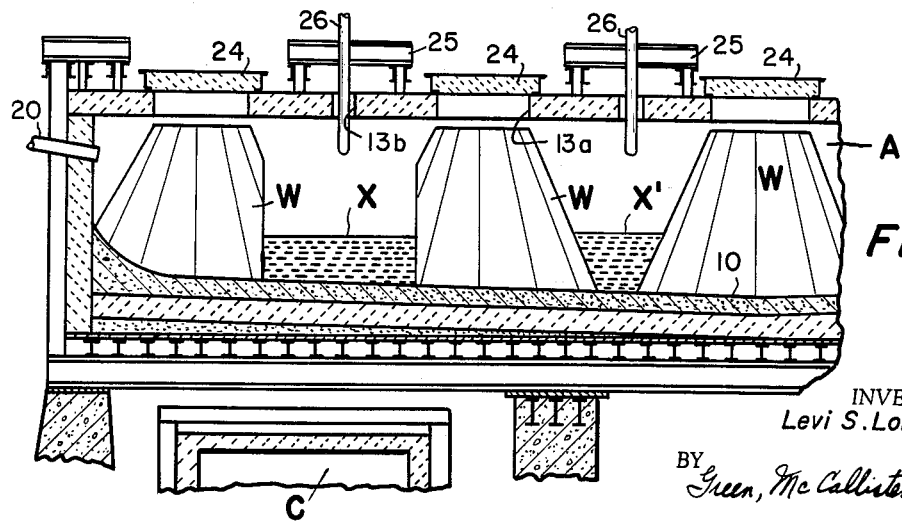
FIGURE 25 is a side sectional view in elevation on the same scale as and of the same portions of the furnace as FIGURE 24 to also illustrate melting procedure.

I have previously indicated procedure employed in accordance with my invention for melting and refining within the furnace A. In FIGURES 24 and 25, I have somewhat diagrammatically illustrated how melting may be accomplished in accordance with my procedure. In this connection, piles of scrap W are positioned in a longitudinally-spaced relation along the furnace (see also FIGURES 11 and 12); each pile W may constitute approximately 40 tons of material. The right-hand portions of FIGURES 24 and 25 illustrate the form or shape of a molten pool, designated as X', that may be provided when hot metal is added directly after the scrap charge and without a preliminary application of fuel and oxygen to the scrap material. The left-hand portion of these figures illustrate a type of pool X which is produced by the employment of a preliminary scrap heating or partial melting at the base boundaries; this tends to fuse over and seal-off pore spaces within the scrap material to produce a nearly liquid tight basin which will hold the hot metal and keep it from seeping into the scrap material and freezing. It will be noted that the pool of hot metal X' (which, like the pool X, is the starting pool after hot metal has been introduced) may have a slightly greater depth than the pool X, but is of lesser extent.

As the oxygen-blow melting-down operation as to the scrap piles W progresses, the area of scrap material to be melted progressively decreases, while the area of hot metal progressively increases. It is thus apparent that the amount or intensity of the oxygen-blow application may thus be slowed-down towards the end of the melting-down and refining operation, as the metal pool builds-up and the material of the scrap metal piles becomes molten and enters into and intermingles with the molten metal of the pool to form a homogeneous melt. I have found that the excess heat of the exhaust gases is more than sufficient to pre-heat the scrap to about 1500° F., where, for example, a 50% scrap to 50% molten metal charge is being used. After the refining and melting operation has been completed, the molten metal may then be tapped in a conventional manner. The hearth 10 is an extending hearth in the sense that it is a melting hearth having a sufficient extent or area for receiving a group or a plurality of stacked piles of solid scrap material or metal thereon.

What I claim is:

1. An improved operating method for melting and refining a metal charge including solid scrap material within a furnace having a melting hearth which comprises, preheating the scrap material to a temperature approaching about 1500° F. and below a temperature at which the material becomes tacky, substantially retaining the preheat of the scrap material and charging it in the form of stacked piles on the hearth of the furnace, forming molten metal pools on the hearth about base portions of the stacked piles, and refining the metal on the hearth and progressively melting down the stacked piles into the molten metal pools; the preheating of the scrap material being accomplished by withdrawing hot gases from the furnace during the refining and melting operation, by first applying the withdrawn hot gases to preliminarily preheated scrap material and bringing it up to a temperature suitable for charging into the furnace, and by thereafter applying the thus partially cooled gases to cold scrap material and bringing it up to a preliminary preheated temperature.

2. An improved operating method for melting and refining a metal charge including solid scrap material within a furnace having an extending hearth which comprises, introducing the scrap material in a preheated condition downwardly into the furnace, building-up a group of stacked piles of scrap along the hearth thereof, progressively melting down the stacked piles into a molten metal pool on the hearth and refining the charge, withdrawing hot exhaust gases from the furnace during the melting down and refining operation, segregating solid scrap material in the form of at least two separate groups, progressively passing the hot exhaust gases through solid scrap material of the separate groups in progressively decreased temperature stages for preheating it for introduction into the furnace, raising fully preheated scrap material to a charging position adjacent the furnace, and then charging the raised preheated scrap material downwardly into the furnace.

3. An improved operating method for melting and refining a metal charge including solid scrap material within a furnace having an extending hearth which comprises, charging preheated scrap material on the hearth in the form of upwardly stacked piles therealong, providing molten metal pools on the hearth about base portions of the stacked piles, injecting oxygen jets downwardly into the furnace between the stacked piles and towards the molten metal pools, continuing the injection of the oxygen jets to refine the charge and progressively melt down the stacked piles into the molten metal pools and withdrawing hot exhaust gases from the furnace adjacent opposite ends thereof, passing the withdrawn exhaust gases through solid scrap material to clean and cool the gases and preheat the scrap material for subsequent melting and refining within the furnace, positioning solid scrap material to be preheated in a preliminary and a final preheating zone, first passing the hot exhaust gases withdrawn from the furnace through scrap material in the final preheating zone to finally heat the material in preparation for charging it on the hearth and to partially cool the exhaust gases, then passing the partially cooled exhaust gases from the final zone through scrap material in the preliminary preheating zone to premilinarily heat the material and further cool the exhaust gases, then passing the further cooled exhaust gases from the preliminary zone to a stack, removing the scrap material finally heated in the final zone therefrom and charging it on the hearth, then moving the scrap material preliminarily heated in the preliminary zone into the final heating zone, and introducing cold scrap material into the preliminary heating zone.

4. An improved operating method for melting and refining a metal charge including solid scrap material within a furnace having an extending hearth which comprises, placing the scrap material on the hearth in the form of upwardly stacked piles therealong, providing molten metal pools on the hearth about base portions of the stacked piles, injecting oxygen jets into the furnace between the stack piles towards the molten metal pools and setting-up and maintaining an exothermic reaction with the metal of the molten metal pools, continuing to inject the oxygen jets until the stacked piles are melted into the molten metal pools and the charge has been refined, withdrawing hot exhaust gases from the furnace adjacent at least one end of its extending hearth, introducing supplemental oxygen into the furnace adjacent a point of withdrawal of the hot exhaust gases, substantially fully converting carbon monoxide in such gases to carbon dioxide before the hot exhaust gases are withdrawn from the furnace, passing the withdrawn hot exhaust gases through a tunnel into a final preheating zone and through scrap material in such zone to finally preheat it, passing the thus partially cooled exhaust gases into a preliminary preheating zone and through cold scrap material therein to preliminarily preheat the scrap material, and then withdrawing the exhaust gases through a tunnel from the preliminary preheating zone at a reduced temperature in the neighborhood of 300° to 400° F.

5. An improved operating method for melting and refining a metal charge including solid scrap material within a furnace having an extending hearth which comprises, charging finally preheated scrap material on the hearth in the form of upwardly stacked piles therealong and with base portions of the piles in a spaced-apart relation on the hearth, sealing-off interstices of the scrap material along the base portions of the piles, providing molten metal pools on exposed portions of the hearth along the sealed-off base portions of the stacked piles, projecting oxygen on the molten metal pools and setting-up an exothermic reaction within the molten metal pools, continuing the projection of the oxygen and progressively refining the charge and melting down the stacked piles into the molten metal pools, withdrawing hot exhaust gases from the furnace, and employing the withdrawn hot exhaust gases to preliminarily preheat cold scrap material and to finally preheat the preliminarily preheated scrap material before it is charged into the furnace.

6. An improved operating method as defined in claim 5 wherein the final preheating of the scrap material by the exhaust gases is effected below a temperature at which the scrap material becomes tacky.

7. An improved operating method for melting and refining a metal charge including solid scrap material within a furnace having an extending hearth which comprises, introducing the scrap material into the furnace and building up a group of stacked piles of the scrap material on the hearth, providing molten metal pools in the spacing between the stacked piles, directing oxygen jets within the furnace towards the molten metal pools, progressively melting down the stacked piles into the molten metal pools on the hearth and refining the charge, withdrawing hot exhaust gases from the furnace and passing them through preliminarily preheated scrap material in one zone to finally preheat it before it is charged into the furnace, employing the thus partially cooled exhaust gases to preliminarily preheat cold scrap material by passing such gases through such material in another zone before the material is subjected to the defined final preheating, and thereafter moving preliminarily preheated scrap material from the other zone into the one zone for its final preheating.

8. An improved operating method as defined in claim 7 wherein, the scrap material is finally preheated by the hot exhaust gases to a temperature of about 1500° F. in a zone that is separate from the furnace, and the scrap material is retained at substantially such final preheated temperature until introduced into the furnace.

9. An improved operating method as defined in claim 8 wherein the exhaust gases are finally cooled to a temperature of about 300° to 400° F. before being discharged into a stack.

10. An improved operating method for melting and refining a metal charge including solid scrap material within a furnace having an extending hearth which comprises, charging the scrap material into the furnace and building-up a group of stacked piles of the scrap material on the hearth, providing molten metal pools in the spacing between the stacked piles, directing oxygen jets within the furnace between the stacked piles and towards the molten metal pools, progressively melting down the stacked piles into the molten metal pools on the hearth and refining the charge, continuously withdrawing hot exhaust gases from at least one end of the furnace into a final preheating zone and passing them through preliminarily preheated scrap material in such zone to finally preheat it for charging into the furnace, and thereafter passing the thus partially cooled exhaust gases into a preliminary preheating zone and through cold scrap material therein to preliminarily preheat the scrap material before it is introduced into the final preheating zone.

11. An improved operating method for melting and refining a metal charge including solid scrap material within a furnace having an extending hearth which comprises, introducing preheated scrap material on the hearth in the form up upwardly stacked piles therealong, providing molten metal pools on the hearth along base portions of the stacked piles, directing oxygen jets within the furnace between the stacked piles and towards the molten metal pools, refining the metal charge on the hearth by reacting the oxygen thus introduced with the molten metal of the pools and progressively melting the stacked piles down into the pools, withdrawing hot exhaust gases from the furnace adjacent at least one end of its hearth, introducing supplemental oxygen into the furnace adjacent the point of withdrawal of the hot exhaust gases and substantially fully converting carbon monoxide gas to carbon dioxide gas before the exhaust gases are withdrawn from the furnace; providing at least three groups of scrap material, one of which is finally preheated for charging into the furnace, a second of which is preliminarily preheated and the third of which is relatively cold, by first passing the exhaust gases withdrawn from the furnace through preliminarily preheated scrap material and bringing the scrap material up to a final preheated temperature to provide the one group, then passing the thus partially cooled exhaust gases through cold scrap material and bringing the cold scrap material up to a preliminary preheat to provide the second group, and progressively supplying additional cold scrap material to provide the third group.

12. An improved operating method for melting and refining the metal charge including solid scrap material within a furnace having an extending hearth which comprises, introducing the scrap material into the furnace and building-up a group of spaced-apart cone-shaped stacked piles of the scrap material on the hearth, preliminarily burning fuel in the furnace along base portions of the stacked piles until the materials of the lower reaches of the stacked piles are sufficiently melted to close off their interstices and make them substantially liquid-tight, introducing molten pig iron into the furnace on the health in the spacing between the stacked piles and to the depth of the lower reaches of such piles that are liquid-tight to provide molten metal pools on the hearth between the stacked piles, injecting oxygen gas within the furnace between the stacked piles and towards the molten metal pools, and refining the metal in the pools and progressively melting down the stacked piles into the molten metal pools.

13. An improved operating method for simultaneously melting and refining a metal charge including solid scrap material within a furnace having an extending hearth which comprises, introducing separate scrap charges downwardly through separate roof openings into the furnace and building-up the separate charges of scrap material on the hearth in the form of individual upwardly converging cone-shaped piles that have their base portions in a spaced-apart relation with respect to each other on the hearth, pouring molten pig iron metal on the hearth in the spacing between and along base portions of the stacked piles and forming and maintaining a plurality of molten metal pools directly on the hearth between the stacked piles and on opposite sides of at least one pile, injecting oxygen gas between the stacked piles and centrally into the molten metal pools, and refining the metal in the pools and progressively melting down the stacked piles into the pools until the stacked piles have been fully melted down on the hearth into a homogeneous full melt on the hearth.

14. An improved operating method for melting and refining a metal charge including solid scrap material within a furnace having an extending hearth which comprises, introducing separate scrap material charges downwardly through separate roof openings into the furnace and building up the separate charges of scrap material on the hearth in the form of individual cone-shaped stacked piles that are spaced-apart therealong, preliminarily directing burning fuel along base portions of the stacked piles and closing-off their interstices, introducing molten pig iron on the hearth in the furnace between the stacked piles to substantially the depth of the closed-off interstices of the base portions of the stacked piles to provide molten metal pools on the hearth between the stacked piles, injecting oxygen gas within the furnace between the stacked piles and towards the molten metal pools, and refining the metal in the pools and progressively melting-down the stacked piles into the pools.

15. An improved operating method for melting and refining a metal charge including solid scrap material within a furnace having an extending hearth which comprises, charging finally preheated scrap material on the hearth in the form of upwardly stacked piles therealong, providing molten metal pools on the exposed portions of the hearth along base portions of the stacked piles, projecting oxygen on the molten metal pools and setting-up an exothermic reaction within the molten metal pools, continuing the projection of the oxygen and progressively refining the charge and melting-down the stacked piles into the molten metal pools, withdrawing hot exhaust gases from the furnace, employing the withdrawn hot exhaust gases to preliminarily preheat cold scrap material and to finally preheat the preliminarily preheated scrap material before it is charged into the furnace, and enclosing the scrap material within heat-retaining containers during the preliminary and final preheating thereof by the exhaust gases and after the final preheating thereof until it is charged into the furnace.

16. An improved operating method for melting and refining a metal charge including solid scrap material within a furnace having an extending hearth which comprises, introducing the scrap material into the furnace and building up a group of stacked piles of the scrap material on the hearth, providing molten metal pools in the spacing between the stacked piles, directing oxygen jets within the furnace towards the molten metal pools, progressively melting-down the stacked piles into the molten metal pools on the hearth and refining the charge, withdrawing hot exhaust gases from the furnace and passing them through preliminarily preheated scrap material to finally preheat it before it is charged into the furnace, employing the thus partially cooled exhaust gases to preliminarily preheat cold scrap material by passing such gases through such material before the material is subjected to the defined final preheating, and mixing cool air with the exhaust gases at a spaced location from the furnace and lowering the temperature of the exhaust gases before they are passed through the scrap material to finally preheat it.

17. An improved operating method for melting and refining a metal charge including solid scrap material within a furnace having an extending hearth which comprises, introducing the scrap material into the furnace and building up a group of stacked piles of the scrap material on the hearth, providing molten metal pools in the spacing between the stacked piles, directing oxygen jets within the furnace towards the molten metal pools, progressively melting-down the stacked piles into the molten metal pools on the hearth and refining the charge, withdrawing hot exhaust gases from the furnace and passing them through preliminarily preheated scrap material to finally preheat it before it is charged into the furnace, employing the thus partially cooled exhaust gases to preliminarily preheat cold scrap material by passing such gases through such material before the material is subjected to the defined final preheating, drawing the hot exhaust gases through a tunnel from the furnace, and lowering the temperature of the exhaust gases in the tunnel from the furnace temperature to a temperature of about 2500° F. before passing them through the preliminarily preheated scrap material to heat it to a final preheat.

References Cited by the Examiner
UNITED STATES PATENTS

| | | | |
|---|---|---|---|
| 1,917,709 | 7/1933 | Griffith | 214—307 |
| 2,063,402 | 12/1936 | Rossman | 75—43 |
| 2,603,476 | 7/1952 | Whiston | 266—34 |
| 2,818,247 | 12/1957 | Francis | 266—34 |
| 2,820,706 | 1/1958 | Larsen | 75—52 |
| 2,878,115 | 3/1959 | Schane et al. | 75—52 |
| 3,088,821 | 5/1963 | Brion et al. | 75—52 |

BENJAMIN HENKIN, *Primary Examiner.*

UNITED STATES PATENT OFFICE
CERTIFICATE OF CORRECTION

Patent No. 3,219,439                        November 23, 1965

Levi S. Longenecker

It is hereby certified that error appears in the above numbered patent requiring correction and that the said Letters Patent should read as corrected below.

Column 2, line 14, for "outer" read -- other --; line 26, for "he" read -- the --; line 35, after "for" insert -- its --; column 3, line 66, for "acordance" read -- accordance --; column 5, line 54, for "down-take" read -- down-takes --; column 7, line 57, for "Howover" read -- However --; line 70, for "scrap." read -- scrap,--; column 8, line 53, for "operations" read -- operation --; column 13, line 27, for "life-hand" read -- left-hand --; column 16, line 30, for "premilinarily" read -- preliminarily --; column 18, line 29, for "health" read -- hearth --.

Signed and sealed this 20th day of September 1966.

(SEAL)
Attest:

ERNEST W. SWIDER
Attesting Officer

EDWARD J. BRENNER
Commissioner of Patents